(12) United States Patent
Teruyama et al.

(10) Patent No.: US 10,931,331 B2
(45) Date of Patent: Feb. 23, 2021

(54) COMMUNICATION DEVICE AND METHOD

(71) Applicant: SONY CORPORATION, Tokyo (JP)

(72) Inventors: Katsuyuki Teruyama, Tokyo (JP);
Toshihisa Takayama, Kanagawa (JP);
Masato Kita, Kanagawa (JP)

(73) Assignee: SONY CORPORATION, Tokyo (JP)

(*) Notice: Subject to any disclaimer, the term of this patent is extended or adjusted under 35 U.S.C. 154(b) by 0 days.

(21) Appl. No.: 16/606,923

(22) PCT Filed: Apr. 13, 2018

(86) PCT No.: PCT/JP2018/015470
§ 371 (c)(1),
(2) Date: Oct. 21, 2019

(87) PCT Pub. No.: WO2018/198813
PCT Pub. Date: Nov. 1, 2018

(65) Prior Publication Data
US 2020/0212962 A1    Jul. 2, 2020

(30) Foreign Application Priority Data
Apr. 28, 2017 (JP) .................. 2017-090036

(51) Int. Cl.
*H04B 5/00* (2006.01)
*H04W 76/10* (2018.01)
*G06K 7/10* (2006.01)

(52) U.S. Cl.
CPC ....... *H04B 5/0031* (2013.01); *G06K 7/10297* (2013.01)

(58) Field of Classification Search
CPC .. H04B 5/0031; H04B 5/0056; H04B 5/0062; H04B 1/3816; H04W 76/10; H04W 76/11; H04W 4/80; H04W 12/00407; G06K 7/10297
See application file for complete search history.

(56) References Cited

U.S. PATENT DOCUMENTS

| 9,648,581 B1* | 5/2017 | Vaynblat ............. G06Q 50/01 |
| 10,284,260 B2* | 5/2019 | Zhu ..................... H04L 12/185 |
| 2005/0117529 A1* | 6/2005 | Ramos-Escano ..... H04L 69/169 370/282 |

(Continued)

FOREIGN PATENT DOCUMENTS

| JP | 2000-298712 A | 10/2000 |
| JP | 2009-048415 A | 3/2009 |

(Continued)

OTHER PUBLICATIONS

Mar. 26, 2020, European Search Report issued for related EP Application No. 18791684.6.

*Primary Examiner* — Andrew Wendell
(74) *Attorney, Agent, or Firm* — Paratus Law Group, PLLC

(57) ABSTRACT

The present disclosure relates to a communication device and method capable of suppressing subjective quality deterioration at the time of a low bit rate. An application selection unit of an IC card selects an application hosted by a communication target device. Identification information of the communication target device is acquired after the application is selected. The present disclosure can be applied to, for example, a communication system.

16 Claims, 54 Drawing Sheets

(56) References Cited

U.S. PATENT DOCUMENTS

| | | | |
|---|---|---|---|
| 2008/0061152 A1* | 3/2008 | Shingai | G06K 19/0723 |
| | | | 235/492 |
| 2008/0212558 A1 | 9/2008 | Aillaud et al. | |
| 2009/0247078 A1* | 10/2009 | Sklovsky | H04L 67/16 |
| | | | 455/41.1 |
| 2015/0038077 A1* | 2/2015 | Suzuki | G06Q 20/3278 |
| | | | 455/41.1 |
| 2015/0162954 A1* | 6/2015 | Socol | H04B 5/0025 |
| | | | 455/41.1 |
| 2016/0165056 A1* | 6/2016 | Bargetzi | H04L 12/1822 |
| | | | 455/416 |
| 2017/0103237 A1* | 4/2017 | Roehrle | G06K 7/10297 |
| 2017/0188296 A1* | 6/2017 | Fujikami | H04W 80/00 |
| 2020/0052905 A1* | 2/2020 | Mathias | H04L 9/3263 |

FOREIGN PATENT DOCUMENTS

| | | |
|---|---|---|
| JP | 2012-008888 A | 1/2012 |
| WO | WO 2015/189229 A1 | 12/2015 |

* cited by examiner

REQA: | S | 0110010 | E |

WUPA: | S | 0100101 | E |

B

ATQA:

| b16 | b15 | b14 | b13 | b12 | b11 | b10 | b9 | b8 | b7 | b6 | b5 | b4 | b3 | b2 | b1 |
|---|---|---|---|---|---|---|---|---|---|---|---|---|---|---|---|
| RFU | | | | Proprietary coding | | | | UID size bit frame | | RFU | Bit frame anticollision | | | | |

C

| b8 | b7 | UID size | CL |
|---|---|---|---|
| 0 | 0 | Single(4 bytes) | 1 |
| 0 | 1 | Double(7 bytes) | 2 |
| 1 | 0 | Triple(10 bytes) | 3 |
| 1 | 1 | RFU | n/a |

FIG. 8
| CL | SEL | NVB | PARAMETER |
|---|---|---|---|
| CL1 | '93' | '20' | empty |
| CL2 | '95' | '20' | empty |
| CL3 | '97' | '20' | empty |
A
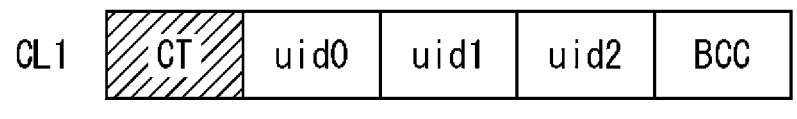
CL1
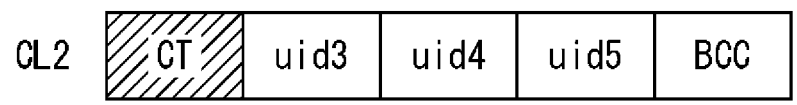
CL2
B
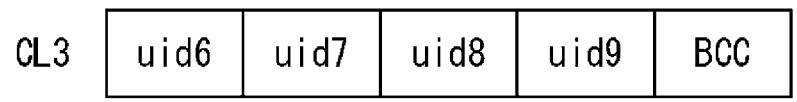
CL3
1 byte

FIG. 9

| b8 | b7 | b6 | b5 | b4 | b3 | b2 | b1 | Meaning |
|----|----|----|----|----|----|----|----|---------|
| x | x | x | x | x | 1 | x | x | Cascade bit set:UID not complete |
| x | x | 1 | x | x | 0 | x | x | UID complete,PICC compliant with ISO/IEC 14443-4 |
| x | x | 0 | x | x | 0 | x | x | UID complete,PICC not compliant with ISO/IEC 14443-4 |

"x" means a "don't care" value.

| CL | SEL | NVB | PARAMETER |
|---|---|---|---|
| CL1 | '9F' | '50' | CT, SC0, SC1 |
| CL2 | '95' | '20' | empty |
| CL3 | '97' | '20' | empty |

FIG. 15

| Payload Field(s) | Length | Value/Description |
|---|---|---|
| Route | 1 Octet | NFCEE ID OF ROUTE DESTINATION |
| Power State | 1 Octet | CONDITION OF Power State TO WHICH ROUTING SETTING IS APPLIED |
| SC Route List | 2n Octets | CONNECTION LIST OF n SCS (2 BYTES) |

FIG. 16

| CL | SEL | NVB | PARAMETER |
|---|---|---|---|
| CL1 | '9F' | '40' | CT, AI0 |
| | | '50' | CT, AI0, AI1 |
| | | '60' | CT, AI0, AI1, AI2 |
| CL2 | '95' | '20' | empty |
| | | '40' | CT, AI3 |
| | | '50' | CT, AI3, AI4 |
| | | '60' | CT, AI3, AI4, AI5 |
| CL3 | '97' | '20' | empty |

FIG. 17

| CL | SEL | NVB | PARAMETER |
|---|---|---|---|
| CL1 | '9F' | '40' | CT, AI0 |
| | | '50' | CT, AI0, AI1 |
| | | '60' | CT, AI0, AI1, AI2 |
| CL2 | '95' | '20' | empty |
| | | '40' | CT, AI3 |
| | | '50' | CT, AI3, AI4 |
| | | '60' | CT, AI3, AI4, AI5 |
| CL3 | '97' | '40' | CT, AI6 |
| | | '50' | CT, AI6, AI7 |
| | | '60' | CT, AI6, AI7, AI8 |
| CL4 | '99' | '20' | empty |
| | | '40' | CT, AI9 |
| | | '50' | CT, AI9, AI10 |
| | | '60' | CT, AI9, AI10, AI11 |
| CL5 | '9B' | '20' | empty |
| | | '40' | CT, AI12 |
| | | '50' | CT, AI12, AI13 |
| | | '60' | CT, AI12, AI13, AI14 |
| CL6 | '9D' | '20' | empty |
| | | '40' | CT, AI15 |
| CL7 | '90' | '20' | empty |

FIG. 20

| REQA_X | '39' | AS_LEN | AS0 | ... | ASn | PARAM | CRC_A(2 bytes) |

FIG. 21

| REQA_X1 | '39' | AFI | PX1 | CRC_A(2 bytes) |

| REQA_X2 | '3A' | SC0 | SC1 | PX2 | CRC_A(2 bytes) |

| REQA_X3 | '3C' | AID_LEN | AID0 | ... | AIDn | PX3 | CRC_A(2 bytes) |

FIG. 22

| ATQA_X0 | ATQA_X1 | AP_L | AP0 | ... | APn | CRC_A(2 bytes) |
|---|---|---|---|---|---|---|

ATQA_X

FIG. 23

| | b8 | b7 | b6 | b5 | b4 | b3 | b2 | b1 |
|---|---|---|---|---|---|---|---|---|
| ATQA_X0 | UID size bit frame | | RFU | Bit frame anticollision | | | | |

| | b16 | b15 | b14 | b13 | b12 | b11 | b10 | b9 |
|---|---|---|---|---|---|---|---|---|
| ATQA_X1 | RFU | | | | Proprietary coding | | | |

FIG. 25

| ATQA_X0 | ATQA_X1 | SAK | AP_L | AP0 | ... | APn | CRC_A(2 bytes) |
|---|---|---|---|---|---|---|---|

ATQA_X

FIG. 29

| AFI most significant half byte | AFI least significant half byte | Meaning-PICCs respond from | Examples/Note |
|---|---|---|---|
| '0' | '0' | All families and sub-families | No application preselection |
| X | '0' | All sub-families of family X | Wide application preselection |
| X | Y | Only the Yth sub-family of family X | |
| '0' | Y | Proprietary sub-family Y only | |
| '1' | '0',Y | Transport | Mass transit, bus, airline, etc. |
| '2' | '0',Y | Financial | IEP, banking, retail, etc. |
| '3' | '0',Y | Identification | Access control, etc. |
| '4' | '0',Y | Telecommunication | Public telephony, GSM, etc. |
| '5' | '0',Y | Medical | |
| '6' | '0',Y | Multimedia | Internet services, etc. |
| '7' | '0',Y | Gaming | |
| '8' | '0',Y | Data Storage | Portable files, etc. |
| '9' – 'D' | '0',Y | RFU | |
| 'E' | '0' Y=1, Y=2, Other Y values are RFU | Machine Readable Travel Documents (MRTDs) | Y=1 ePassport Y=2 eVisa |
| 'F' | '0',Y | RFU | |

NOTE    X='1' to 'F', Y='1' to 'F'

| b8 | b7 | b6 | b5 | b4 | b3 | b2 | b1 |
|---|---|---|---|---|---|---|---|
| RFU (000b) | | | Extended ATQB supported | REQB/ WUPB | N | | |

B

| b3 | b2 | b1 | N |
|---|---|---|---|
| 0 | 0 | 0 | $1=2^0$ |
| 0 | 0 | 1 | $2=2^1$ |
| 0 | 1 | 0 | $4=2^2$ |
| 0 | 1 | 1 | $8=2^3$ |
| 1 | 0 | 0 | $16=2^4$ |
| 1 | 0 | 1 | RFU |
| 1 | 1 | X | RFU |

FIG. 31

| 1st byte | 2nd, 3rd bytes |
|---|---|
| APn (1 byte) | CRC_B (2 bytes) |

FIG. 32

| b8 | b7 | b6 | b5 | b4 | b3 | b2 | b1 |
|----|----|----|----|----|----|----|----|
| Slot number | | | | (0101b) | | | |

FIG. 33

| nnnn | Slot number |
|------|-------------|
| 0001 | 2 |
| 0010 | 3 |
| 0011 | 4 |
| ……… | ……… |
| 1110 | 15 |
| 1111 | 16 |

| 1st byte | 2nd, 3rd, 4th, 5th bytes | 6th, 7th, 8th, 9th bytes | 10th, 11th, 12th bytes | 13th, 14th bytes |
|---|---|---|---|---|
| '50' (1 byte) | PUPI (4 bytes) | Application Data (4 bytes) | Protocol Info (3 bytes) | CRC_B (2 bytes) |

B

| 1st byte | 2nd, 3rd, 4th, 5th bytes | 6th, 7th, 8th, 9th bytes | 10th, 11th, 12th, 13th bytes | 14th, 15th bytes |
|---|---|---|---|---|
| '50' (1 byte) | PUPI (4 bytes) | Application Data (4 bytes) | Protocol Info (4 bytes) | CRC_B (2 bytes) |

| b8 | b7 | b6 | b5 | b4 | b3 | b2 | b1 |
|---|---|---|---|---|---|---|---|
| RFU (0b) | Time slot | RFU (0b) | Extended ATQB supported | REQB/ WUPB | | N | |

FIG. 40

| b8 | b7 | b6 | b5 | b4 | b3 | b2 | b1 |
|---|---|---|---|---|---|---|---|
| RFU (0b) | Time slot | Extended AFI supported | Extended REQB supported | REQB/ WUPB | N | | |

FIG. 42

| REQB_X | APf '05' | AFI | PARAM | XAFI1_L | XAFI0 | ... | XAFIn | CRC_B |

FIG. 44

| REQA(B) | S | 0 0 1 0 0 1 1 0 | E |

| WUPA(B) | S | 0 1 0 1 0 0 1 0 | E |

FIG. 45

| Byte 1 | | | | | | | | Byte 2 | | | | | | | |
|---|---|---|---|---|---|---|---|---|---|---|---|---|---|---|---|
| b8 | b7 | b6 | b5 | b4 | b3 | b2 | b1 | b8 | b7 | b6 | b5 | b4 | b3 | b2 | b1 |
| \multicolumn{5}{c}{Bit frame anticollision} | \multicolumn{3}{c}{RFU} | \multicolumn{3}{c}{RFU} | | | \multicolumn{4}{c}{RFU} | | | |

ATQA(B)

FIG. 48

| Type | Name | Coding (b8-b1) | Meaning |
|---|---|---|---|
| Command | REQA_t | (b7-b1) (0110101)b (='35') | Request PICC Type A timeslot to answer ATQA_t. |
| Response | ATQA_t | any one-byte content of '00' to 'FF' | Answer to REQA_t. PCD can recognize the existence of Type A timeslot PICC. However, the PCD is not required to recognize the coding of the ATQA_t. |

| Type | Name | Coding (b8-b1) | Meaning |
|---|---|---|---|
| Command | REQ-ID | (00001000)b (='08') | Request PICC to answer its UID to one of timeslots. REQ-ID is followed by two parameters. |
| Response | ATQ-ID | (00000110)b (='06') | Answer 8-byte UID to one of 4 timeslots. ATQ-ID is followed by its 8-byte UID. |
| Command | SEL_t | (01000NNN)b, (NNN=CID_t No. (0-7))<br>(01100NNN)b, (NNN+8=CID_t No. (8-15)) | Select the PICC with its UID and set the CID_t. SEL_t is followed by 8-byte UID. |
| Response | SAK_t | b8-b5(1000)b, Additional information available in protocols<br>b8-b5(1100)b: Default mode in protocols<br>b4-b1(0000)b: Other than ISO/IEC 14443-4<br>b4-b1(0001)b: PICC supports ISO/IEC 14443-4 | Acknowledge SEL_t. |
| Command | HLTA_t | (00011NNN)b, (NNN=CID_t No. (0-7))<br>(00111NNN)b, (NNN+8=CID_t No. (8-15)) | Halt the PICC with its CID_t. |
| Response | Answer to HLTA_t | (00000110)b (='06') | Acknowledge HLTA_t. |

FIG. 49

| Parameters | | Meaning |
|---|---|---|
| P1 | b8-b7 | Timeslot length, b7=(1)b: for 8-byte UID, b8=(0)b |
|  | b6-b1 | Number of timeslots, b3=(1)b: for four timeslots, Others=(0)b |
| P2 | | '00' |

FIG. 52

| b8 | b7 | b6 | b5 | b4 | b3 | b2 | b1 | |
|---|---|---|---|---|---|---|---|---|
| 0 | 0 | 0 | 0 | 0 | 0 | 0 | x | RFU | 0: COMPLIANCE WITH REQ-ID FORMAT<br>1: COMPLIANCE WITH REQ-ID_X FORMAT |

FIG. 54

| | Byte 1-6 | Byte 7-8 | Byte 9 | Byte 10 | Byte 11-12 | Byte 13 | Byte 14 | Byte 15-16 |
|---|---|---|---|---|---|---|---|---|
| POLLING REQUEST | PREAMBLE | SYNC | LEN | '00' | System code | Request code | Time slot number | CRC_F |

FIG. 55

| Byte 1-6 | Byte 7-8 | Byte 9 | Byte 10 | Byte 11-18 | Byte 19-26 | Byte 27-28 | Byte 27-28/29-30 |
|---|---|---|---|---|---|---|---|
| PREAMBLE | SYNC | LEN | '01' | NFCID2 | PAD | [Request data] | CRC_F |

POLLING RESPONSE

*FIG. 57*

REQA-F | 00100110

FIG. 59

| STANDARD / PROCEDURE | #1 ISO/IEC 14443 A (ISO/IEC 18092 106 kbit/s) | #2 ISO/IEC 14443 B EXAMPLE B1 | #3 ISO/IEC 14443 A REV., EXAMPLES A1, A2 | #4 ISO/IEC 14443 A REV., EXAMPLE A3 | #5 ISO/IEC 14443 A REV., EXAMPLE A4 | #6 ISO/IEC 14443 B REV., EXAMPLE B2 | #7 ISO/IEC 14443 B REV., EXAMPLE B3 | #8 ISO/IEC 18092 212 kbit/s. EXTENDED BY JIS X 6319-4 | #9 ISO/IEC 18092 212 kbit/s. EXTENDED REVISION BY JIS X 6319-4, EXAMPLE J1 | #10 ISO/IEC 18092 212 kbit/s. EXTENDED REVISION BY JIS X 6319-4, EXAMPLE J2 |
|---|---|---|---|---|---|---|---|---|---|---|
| 1 | DETECTION OF CARD PRESENCE OR ABSENCE | N/A | DETECTION OF CARD PRESENCE OR ABSENCE | N/A | | N/A | DETECTION OF CARD PRESENCE OR ABSENCE | N/A | DETECTION OF CARD PRESENCE OR ABSENCE | DETECTION OF CARD PRESENCE OR ABSENCE |
| 2 | CARD RECOGNITION AND COLLISION PREVENTION | CARD RECOGNITION (APPLICATION FAMILY SELECTION) AND COLLISION PREVENTION | CARD RECOGNITION (APPLICATION FAMILY SELECTION) AND COLLISION PREVENTION | CARD RECOGNITION (APPLICATION FAMILY SELECTION) AND COLLISION PREVENTION | CARD RECOGNITION (APPLICATION FAMILY SELECTION) | CARD RECOGNITION (APPLICATION FAMILY SELECTION) AND COLLISION PREVENTION | CARD RECOGNITION (APPLICATION FAMILY SELECTION) AND COLLISION PREVENTION | CARD RECOGNITION (APPLICATION FAMILY SELECTION) AND COLLISION PREVENTION | CARD RECOGNITION (APPLICATION FAMILY SELECTION) AND COLLISION PREVENTION | CARD RECOGNITION (APPLICATION FAMILY SELECTION) |
| 3 | PROTOCOL ACTIVATION | PROTOCOL ACTIVATION | PROTOCOL ACTIVATION UNNECESSARY IN CASE OF #2 | PROTOCOL ACTIVATION UNNECESSARY IN CASE OF #2 | PROTOCOL ACTIVATION UNNECESSARY IN CASE OF #2 | PROTOCOL ACTIVATION UNNECESSARY IN CASE OF #2 | PROTOCOL ACTIVATION UNNECESSARY IN CASE OF #2 | N/A | N/A | N/A |
| 4, 5, 6 | #F. 1 | #F. 1 | #F. 1 OR #F. 2 | #F. 1 AND #F. 2 | #F. 1 AND #F. 2 | #F. 1 AND #F. 2 | #F. 1 AND #F. 2 | #F. 2 | #F. 2 | #F. 2 |

FIG. 60

| STANDARD / PROCEDURE | #F.1 ISO/IEC 7816-4 | #F.2 JIS X 6319-4 (FeliCa OS) |
|---|---|---|
| 4 | SELECTION OF APPLICATION | N/A |
| 5 | SELECTION OF FILE | SELECTION OF FILE<br>FILE ACCESS<br>(SELECTION OF APPLICATION USING AREA CODE AND SERVICE CODE, FILE ACCESS) |
| 6 | FILE ACCESS | N/A |

COMMUNICATION DEVICE AND METHOD

CROSS REFERENCE TO PRIOR APPLICATION

This application is a National Stage Patent Application of PCT International Patent Application No. PCT/JP2018/015470 (filed on Apr. 13, 2018) under 35 U.S.C. § 371, which claims priority to Japanese Patent Application No. 2017-090036 (filed on Apr. 28, 2017), which are all hereby incorporated by reference in their entirety.

TECHNICAL FIELD

The present disclosure relates to a communication device and method, and particularly to a communication device and method capable of contributing to a reduction in an entire RF transaction time.

BACKGROUND ART

Short-range wireless communication systems performing wireless communication in a contactless manner in short ranges using integrated circuit (IC) cards have been widely used. For example, use of wireless communication systems as electronic tickets or electronic money is well known. In addition, in recent years, mobile phones that have functions of electronic tickets or electronic money through contactless wireless communication have come into wide use (for example, see Patent Document 1).

Short-range wireless communication systems have rapidly come into wide use globally and have become international standards. Examples of the international standards include ISO/IEC 14443 which is a standard of a proximity type IC card system and ISO/IEC 18092 which is a standard of near field communication interface and protocol (NFCIP)-1.

In short-range wireless communication by ISO/IEC 18092, there are an active communication mode and a passive communication mode. The active communication mode is a communication mode in which a plurality of communication devices transmitting and receiving data transmits data by outputting electromagnetic waves and modulating the electromagnetic waves. In the passive communication mode, one communication device (an initiator) of a plurality of communication devices transmits data by outputting electromagnetic waves and modulating the electromagnetic waves. The other communication devices (targets) of the plurality of communication devices transmit data by performing load modulation of the electromagnetic waves output by the initiator.

In the passive communication mode of ISO/IEC 18092 (hereinafter referred to as Type F), encoding of data by a Manchester is performed in data transmission between a reader-writer and an IC card. In addition, in Type F, 212 kbps and 424 kbps are adopted as communication rates of data. The FeliCa (registered trademark) scheme of Sony Corporation which is the present applicant is equivalent to Type F.

In addition, even in an IC card system of ISO/IEC 14443, for example, there are various communication schemes called Type A and Type B.

Type A is adopted as the MIFARE (registered trademark) type of Philips. In Type A, encoding of data by Miller is performed in data transmission from a reader-writer to an IC card and encoding of data by a Manchester is performed in data transmission from the IC card to the reader-writer. In addition, in Type A, 106 to 847 kilobits per second (kbps) is adopted for a communication layer of data.

In Type B, encoding of data by NRZ is performed in data transmission from a reader-writer to an IC card and encoding of data by NRZ-L is performed in data transmission from the IC card to the reader-writer. In addition, in Type B, 106 kbps is adopted in a communication layer of data.

A communication device performing short-range wireless communication by ISO/IEC 18092 or ISO/IEC 14443 is referred to as an NFC device below. An NFC device is functionally separated into an NFC controller (NFCC) and a device host (DH) and a protocol or a command exchanged between the NFCC and the DH is defined (for example, see Patent Document 1). The NFCC mainly transmits and receives RF data to and from a remote target (a PICC (IC card) of ISO/IEC 14443 or a target of ISO/IEC 18092) via an antenna and the DH mainly performs execution of an application and control of the entire NFC device.

CITATION LIST

Patent Document

Patent Document 1: Japanese Patent Application Laid-Open No. 2009-48415

SUMMARY OF THE INVENTION

Problems to be Solved by the Invention

Incidentally, in the passive communication mode, a wireless device serving as a master performs a "collision prevention procedure" for selecting a wireless device serving as a slave. In particular, in Type A of ISO/IEC 14443, however, it takes some time to enter a state in which information to be used in an application layer can be exchanged.

The present disclosure is devised in view of such circumstances to be able to contribute to a reduction in an entire RF transaction time.

Solutions to Problems

A communication device according to a first aspect of the present technology includes: an application selection unit configured to select an application hosted by a communication target device; and an identification information acquisition unit configured to acquire identification information of the communication target device after the application selection unit selects the application.

The application selection unit may select the application hosted by the communication target device by including application identification information in a command to be first transmitted in an anticollision process, and the identification information acquisition unit may acquire the identification information of the communication target device by performing the anticollision process.

The application identification information has 2 bytes.

The anticollision process is performed using a timeslot.

An SEL value of a first command in the anticollision process is set to a predetermined value.

A device detection unit may further be included, the device detection unit being configured to designate the application identification information and detect whether or not there is a communication target device in a beginning of an initialization process before the anticollision process of designating a timeslot.

A device detection unit may further be included, the device detection unit being configured to designate the application identification information and detect whether or not there is a communication target device in a beginning of an initialization process before the anticollision process in which bit collision is used.

The application selection unit may select the application hosted by the communication target device using an extended polling command in which a standard frame is used.

The extended polling command may store the application identification information and a length of the application identification information.

The extended polling command may include a command classified for each kind of application identification information.

A response command sent by the communication target device receiving the extended polling command may include at least one of the identification information or protocol information of the communication target device.

The application selection unit may introduce timeslots and perform an anticollision process of designating application identification information and the number of slots as a communication initialization process.

The application selection unit performs an anticollision process of designating application identification information and the number of slots as a communication initialization process, and the application identification information is additionally designatable in 2 bytes.

The application selection unit may detect whether or not there is a communication target device through a polling process in a beginning of a communication initialization process and performs an anticollision process of designating application identification information and the number of slots as the communication initialization process.

The communication target device is a near field communication (NFC) device.

A communication method according to the first aspect of the present technology includes: by a communication device, selecting an application hosted by a communication target device; and acquiring identification information of the communication target device after the application is selected.

In the first aspect of the present technology, an application hosted by a communication target device is selected. Then, identification information of the communication target device is acquired after the application is selected.

Effects of the Invention

According to the present disclosure, communication can be performed. In particular, it is possible to contribute to a reduction in an entire RF transaction time.

BRIEF DESCRIPTION OF DRAWINGS

FIG. 6 is a diagram illustrating examples of REQA, ATQA, and a relation between UID sizes and cascade levels.

FIG. 8 is a diagram illustrating examples of a first anticollision command and anticollision data.

FIG. 9 is a diagram illustrating an example of SAK.

FIG. 15 is a diagram illustrating an example of a value field of routing of a system code.

FIG. 16 is a diagram illustrating a case where application identification information is transmitted according to a third embodiment (A11) of the present technology.

FIG. 17 is a diagram illustrating another case where the application identification information is transmitted.

FIG. 20 is a diagram illustrating an example of an extended polling command REQA_X.

FIG. 21 is a diagram illustrating examples of three classified commands.

FIG. 22 is a diagram illustrating an example of a response ATQA_X to the extended polling command.

FIG. 23 is a diagram illustrating an exemplary configuration of the response ATQA_X.

FIG. 25 is a diagram illustrating an exemplary format of ATQA_X according to a fifth embodiment (A4) of the present technology.

FIG. 29 is a diagram illustrating exemplary coding of AFI of REQB in FIG. 28.

FIG. 30 is a diagram illustrating exemplary coding of PARAM of REQB in FIG. 28.

FIG. 31 is a diagram illustrating an exemplary configuration of a SLOT_MAKER command.

FIG. 32 is an explanatory flowchart illustrating another example of a stream selection process.

FIG. 33 is a diagram illustrating exemplary coding of a slot number in FIG. 32.

FIG. 34 is a diagram illustrating examples of a basic format and an extended format of ATQB.

FIG. 40 is a diagram illustrating exemplary coding of PARAM of REQB.

FIG. 42 is a diagram illustrating another exemplary configuration of REQB_X.

FIG. 44 is a diagram illustrating examples of REQA (B) and WUPA (B).

FIG. 45 is a diagram illustrating an example of ATQA (B).

FIG. 48 is a diagram illustrating an example of a set of a command and a response in Type A (the timeslot scheme).

FIG. 49 is a diagram illustrating an example of a parameter of an REQ-ID command in Type A (the timeslot scheme).

FIG. 52 is a diagram illustrating exemplary coding of P2.

FIG. 54 is a diagram illustrating an exemplary configuration of a POLLING REQUST of JIS X 6319-4 extension.

FIG. 55 is a diagram illustrating an exemplary configuration of POLLING RESPONSE of a JIS X 6319-4 extension.

FIG. 57 is a diagram illustrating an example of the format of REQA-F.

FIG. 59 is a diagram illustrating comparison of a process sequence in communication initialization.

FIG. 60 is a diagram illustrating comparison of a process sequence in file access.

MODE FOR CARRYING OUT THE INVENTION

Figure 1:
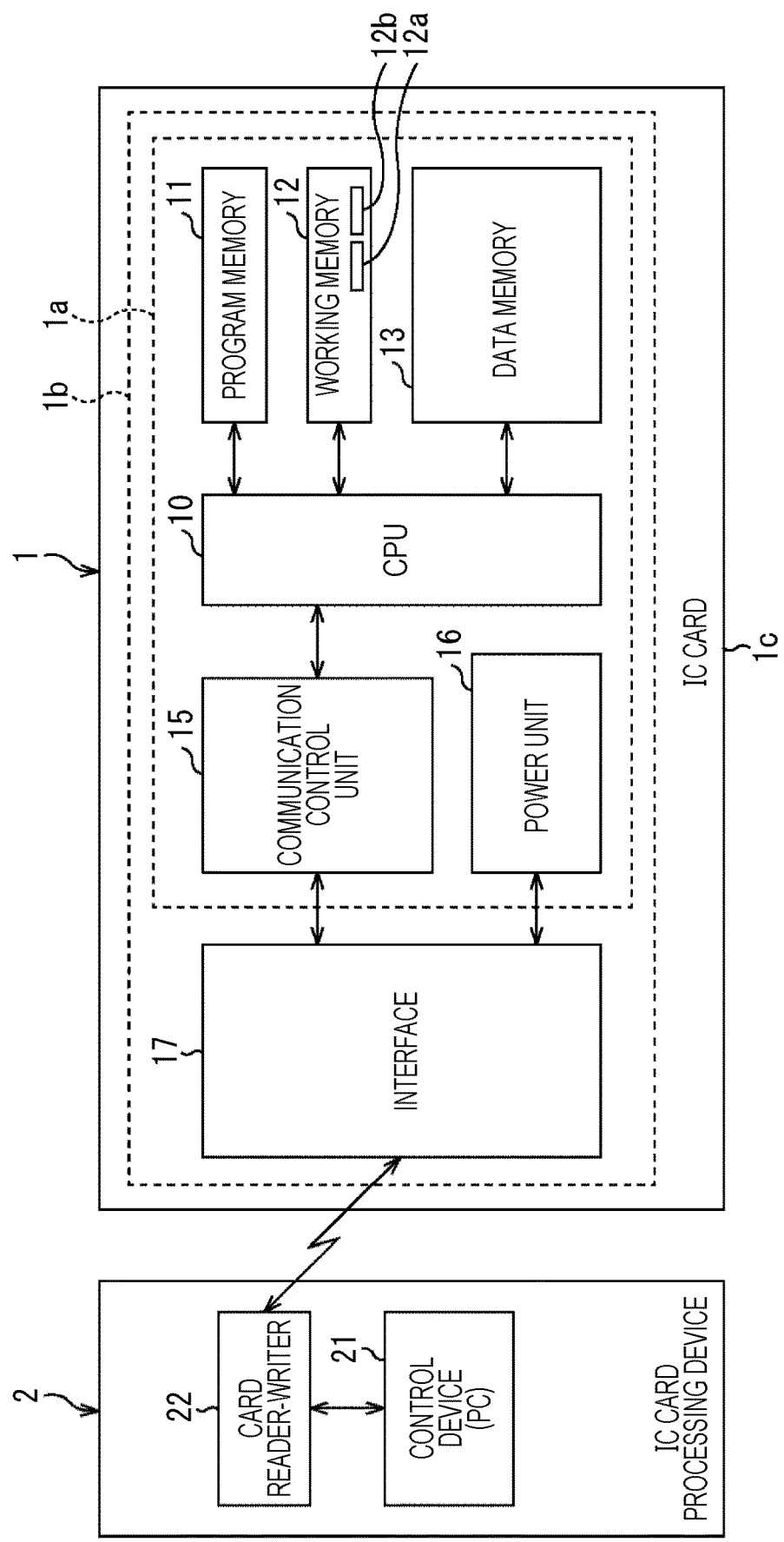
FIG. 1 is a block diagram illustrating an exemplary configuration of a communication system according to the present technology.

Hereinafter, modes for carrying out the present disclosure (hereinafter referred to as embodiments) will be described. Note that the description will be made in the following order.
1. Configuration of communication system
2. Overview of present technology
3. Anticollision process of Type A
4. First embodiment (A1)
5. Second embodiment (A2)
6. Third embodiment (A11)
7. Fourth embodiment (A3)
8. Fifth embodiment (A4)
9. Initialization process of Type B
10. Sixth embodiment (B1)
11. Seventh embodiment (B2)
12. Eighth embodiment (B3)
13. Timeslot initialization process of Type A
14. Ninth embodiment (A5)
15. Initialization process for ISO/IEC 18092 212 kbit/s+ JIS X 6319-4 extension
16. Tenth embodiment (J1)
17. Eleventh embodiment (J2)
18. Process sequence comparison
19. Configuration example of computer 1. Configuration of Communication System FIG. 1 is a block diagram illustrating an exemplary configuration of a communication system according to the present technology. The communication system in FIG. 1 includes an IC card (PICC) 1 and an IC card processing device 2 of Type A of the standard ISO/IEC 14443.

The IC card 1 becomes operable (is activated) when power is supplied from the IC card processing device 2 which is an external device. The operable IC card 1 performs various processes in response to various commands from the IC card processing device 2. That is, the IC card processing device 2 supplies power for operating the IC card 1 and supplies a command for requesting various processes to the IC card 1. The command supplied to the IC card 1 by the IC card processing device 2 is used to request a process in accordance with a purpose, an administrative form, or the like.

The IC card 1 may be a contactless portable electronic device (contactless IC card) that performs wireless communication with the IC card processing device 2 through an antenna, a wireless communication unit, or the like in a contactless state or may be a contact portable electronic device (contact IC card) that comes in physical contact with the IC card processing device 2 and performs communication. Further, the IC card 1 may be a combined IC card (dual-interface IC card) that has a communication function of a contactless IC card and a communication function of a contact IC card. Note that, in the embodiment, a contactless IC card will be mainly assumed in the description. Only a communication scheme or the like with the IC card processing device 2 is different between a contactless IC card and a contact IC card. Therefore, in embodiments to be described below, the same can apply to a contact IC card.

Here, the IC card 1 is assumed to include a near field communication (NFC) device. On the other hand, the IC card processing device 2 is assumed to include a proximity coupling device (PCD) which is a device enabling NFC.

As illustrated in FIG. 1, the IC card 1 includes a CPU 10, a program memory 11, a working memory 12, a data memory 13, a communication control unit 15, a power unit 16, an interface 17, and the like.

In addition, the IC card 1 includes a card-shaped body 1c. One IC chip (or a plurality of IC chips) 1a and antenna are embedded in the card-shaped body 1c included in the IC card 1. The IC chip 1a includes a CPU 10, a program memory 11, a working memory 12, a data memory 13, a communication control unit 15, a power unit 16, and the like. The IC chip 1a is formed as a module in a state in which the IC chip 1a is connected to an antenna serving as the interface 17 and is embedded in the card-shaped body 1c included in the IC card 1. As indicated by a dotted line, a module 1b including one IC chip (or the plurality of IC chips) 1a and an antenna is embedded in the body 1c.

The CPU 10 controls the entire IC card 1. The CPU 10 operates on the basis of a control program and control data or the like stored in the program memory 11 or the data memory 13. The CPU 10 performs a process in response to a command given from the IC card processing device 2 by executing the control program that realizes a basic operation. In addition, by executing a process program installed in accordance with a purpose of the IC card 1 or the like, the CPU 10 realizes a process in accordance with the purpose.

For example, when a command for requesting to write data on the data memory 13 is given from the IC card processing device 2, the CPU 10 performs a process of writing data on the data memory 13. In addition, when a command for requesting to read data stored in the data memory 13 is given from the IC card processing device 2, the CPU 10 performs a process of reading data from the data memory 13.

The program memory 11 includes a read-only memory (ROM). A control program, control data, and the like used to perform a basic operation are stored in advance in the program memory 11. In short, the control program and the control data in accordance with the specification of the IC card 1 are stored in advance in the program memory 11. For example, the CPU 10 realizes a process in response to a command given from the outside in accordance with the control program stored in the program memory 11. In addition, information or the like for designating an attribute or the like of a memory region in the data memory 13 is stored in the program memory 11. Further, information indicating a predetermined execution order of various commands in a specific process is stored in the program memory 11. As an example of such information, information indicating that a random number generation command and an external authentication command are performed in a predetermined execution order in an authentication process is stored in the program memory 11. Note that information indicating the predetermined execution order of each command may be stored in the data memory 13.

The working memory 12 includes a volatile memory (random access memory (RAM)). The working memory 12 functions as a buffer memory that temporarily stores data. For example, data sent and received in a communication process with the IC card processing device (external device) 2 is temporarily stored in the working memory 12. In addition, the working memory 12 is also used as a memory that temporarily retains various kinds of write data or the like.

In addition, a logical channel management table 12a and a history management table 12b are provided in the working memory 12. Here, the logical channel management table 12a and the history management table 12b that are reset whenever the IC card 1 is activated are assumed to be provided in the working memory 12. Note that the logical channel management table 12a or the history management table 12b may be provided in the data memory 13. In a case where the logical channel management table 12a and the history management table 12b are provided in the data memory 13, information stored in the logical channel management table 12a and the history management table 12b is retained even when the IC card 1 is powered off.

In the logical channel management table 12a, information indicating a current state and a security state of each logical channel is stored. In short, a current folder or a current file of each logical channel is determined by referring to the information stored in the logical channel management table 12a. In addition, the security state of each logical channel is determined by referring to the logical channel management table 12a.

In the history management table 12b, history information is stored for each logical channel. The history information of each logical channel is information regarding a command performed for each logical channel. Here, as the history information of each logical channel, it is necessary to store a command code of a command to be referred to when at least a succeeding command is performed. For example, in a form in which only an order of a command that has been performed immediately previously and a command that is to be performed is checked, a command code of the command that has been performed immediately previously is stored as the history information. In addition, in a form in which an order of not only a command that has been performed immediately previous but also a command that has been performed two or more commands previous or an execution result is checked, command codes of the plurality of commands and the execution results are stored as the history information.

The data memory (nonvolatile memory) 13 is a nonvolatile memory capable of writing data. The data memory 13 is configured as, for example, an EEPROM, a flash memory, or the like. Various kinds of information in accordance with use purposes of the IC card 1 are stored in the data memory 13. A data table or the like for storing various kinds of setting information is provided in the data memory 13.

In addition, applications (a process program, administrative data, and the like) in accordance with use purposes of the IC card are stored in the data memory 13. In addition, in a case where the IC card 1 is used for a plurality of use purposes, a plurality of applications in accordance with each use purpose is stored in the data memory 13. Note that an application in accordance with a use purpose of the IC card 1 is stored in each file such as a program file and a data file for each use purpose defined on the data memory 13. Such a file structure is based on, for example, ISO/IEC 7816-4 or JIS X 6319-4. In short, various applications and various administrative data can be stored in the data memory 13 of the IC card 1.

The communication control unit 15 controls data communication with an external device (for example, the IC card processing device 2) via the interface 17. In a case where data is received from the external device, the communication control unit 15 demodulates sent data which is radio waves received by the interface 17 and supplies a demodulated signal to the CPU 10. In addition, in a case where data is sent to the external device, the communication control unit 15 modulates data given from the CPU 10, and dispatches the modulated data as radio waves from an antenna serving as the interface 17. Note that in the case of a contact IC card, the interface 17 includes a terminal or the like that comes in physical contact with a contact unit of an external device.

The power unit 16 generates power and a clock pulse for operating each unit of the IC card 1 from radio waves received by the interface 17. The power unit 16 supplies each unit with a power voltage and the clock pulse generated from the radio waves received by the antenna 17. In addition, in a case where the IC card 1 is activated by supplying the power from the power unit 16, the CPU 10 performs a process of resetting a process state of the IC card 1. Note that in the case of a contact IC card, each unit operates by power and a clock pulse supplied directly from an external device via the interface 17.

As illustrated in FIG. 1, the IC card processing device 2 includes a control device 21 and a card reader-writer 22. The control device 21 is configured as a personal computer (PC) or the like. The control device 21 includes an arithmetic processing unit such as a CPU, various memories such as a RAM, a ROM, a nonvolatile memory, and a hard disk drive, and various interfaces such as a communication interface, as will be described in detail below with reference to FIG. 61, for example. In the control device 21, various processes are realized when the arithmetic processing unit executes various control programs stored in the memories. In addition, the control device 21 inputs and outputs data to and from the card reader-writer 22 performing data communication with the IC card 1.

For example, control programs in accordance with various processes in which the IC card 1 is used are stored in advance in the control device 21. The control device 21 performs various processes in which the IC card 1 is used by executing the above-described control programs. For example, in various processes in which the IC card 1 is used, the control device 21 supplies predetermined commands in a predetermined procedure. The control device 21 performs various processes on the basis of each response (information indicating a process result or the like of the command) from each IC card 1 to each command.

The card reader-writer 22 functions as communication means for performing data communication with the IC card 1. The card reader-writer 22 performs data communication in conformity with a communication scheme compatible with a communication scheme of the IC card 1. In short, the control device 21 realizes the data communication with the IC card 1 via the card reader-writer 22.

In a case where the IC card 1 is a contactless IC card, the card reader-writer 22 includes an antenna and a communication control unit (a modulation-demodulation circuit or the like) to perform data communication with the IC card 1 wirelessly. In a case where data is sent to the contactless IC card 1, the card reader-writer 22 modulates sent data given from the control device 21 and dispatches a modulated signal as radio waves from the antenna. In addition, in a case where data is received from the contactless IC card 1, the card reader-writer 22 causes the communication control unit to demodulate a signal which is the radio waves received by the antenna and supplies the demodulated data as received data to the control device 21. In addition, the card reader-writer 22 sends and receives data and dispatches radio waves serving as a clock pulse and power for operating the IC card 1 from the antenna.

In addition, in a case where the IC card 1 is a contact IC card, the card reader-writer 22 includes a contact unit, a communication control unit, and the like to come in physical contact with the IC card 1 and perform data communication. In a case where data is sent to and received from the contact IC card, the contact unit of the card reader-writer 22 comes in physical contact with the contact unit provided in the IC card 1 and performs various kinds of data communication. In addition, the card reader-writer 22 supplies the power and the clock pulse to the IC card 1 via the contact unit that comes in physical contact with the IC card 1.

Here, in Type A of the standard ISO/IEC 14443, the IC card 1 and the IC card processing device 21 perform anticollision using bit collision as a communication initialization process, acquire a unique identifier (UID) of one communication target IC card 1 from the plurality of IC cards 1, and select the IC card 1. Thereafter, after a stage of selecting an application hosted by the IC card 1 is performed, a process of the application is performed. An initialization process in ISO/IEC 18092 106 kbit/s is the same as that in Type A of ISO/IEC 14443.

2. Overview of Present Technology

Next, an overview of an initialization process will be described with reference to FIG. 2.

Figure 2:
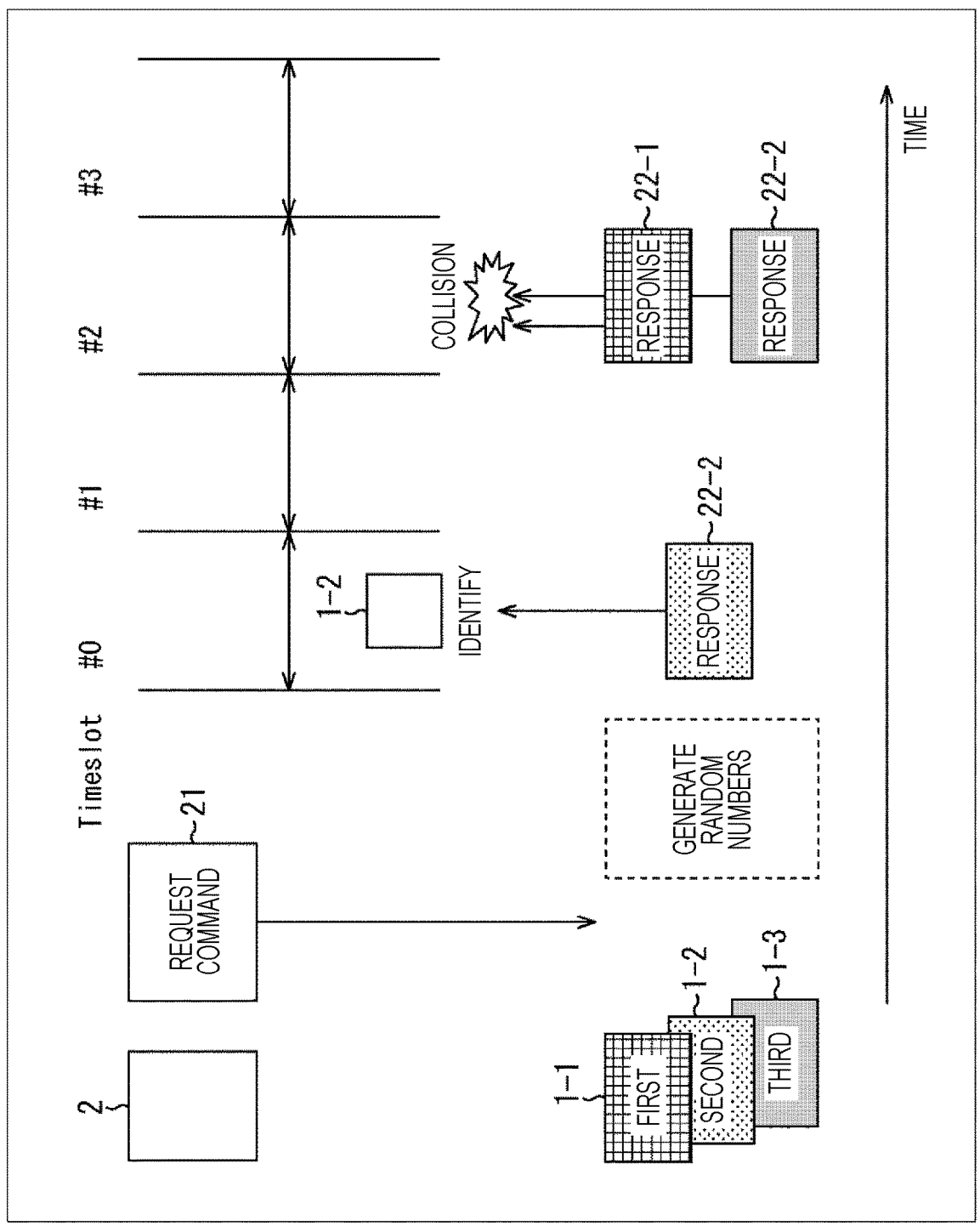
FIG. 2 is an explanatory diagram illustrating an overview of an initialization process.

As illustrated in FIG. 2, the IC card processing device 2 designates the allowable number of received timeslots and sends a request command 21. Thus, it is detected whether or not there is the IC card. Note that this process is configured on a memory when the control device 21 in FIG. 1 executes a predetermined program, for example, this process is performed by a card presence detection unit. IC cards 1-1 to 1-3 reply with responses 22-1 and 22-3 in slots of generated random numbers in a range of the number of timeslots, respectively. The IC card 1-1 replies with the response 22-1 in timeslot #2, the IC card 1-2 replies with the response 22-2 in timeslot #0, and the IC card 1-3 replies with the response 22-3 in timeslot #2.

The IC card processing device 2 waits for reception in each timeslot and identifies the IC card 1-2 from one response 22-2 in the timeslot. Note that the responses 22-1 and 22-3 collide in the same timeslot #2 and no IC card is identified.

Figure 3:
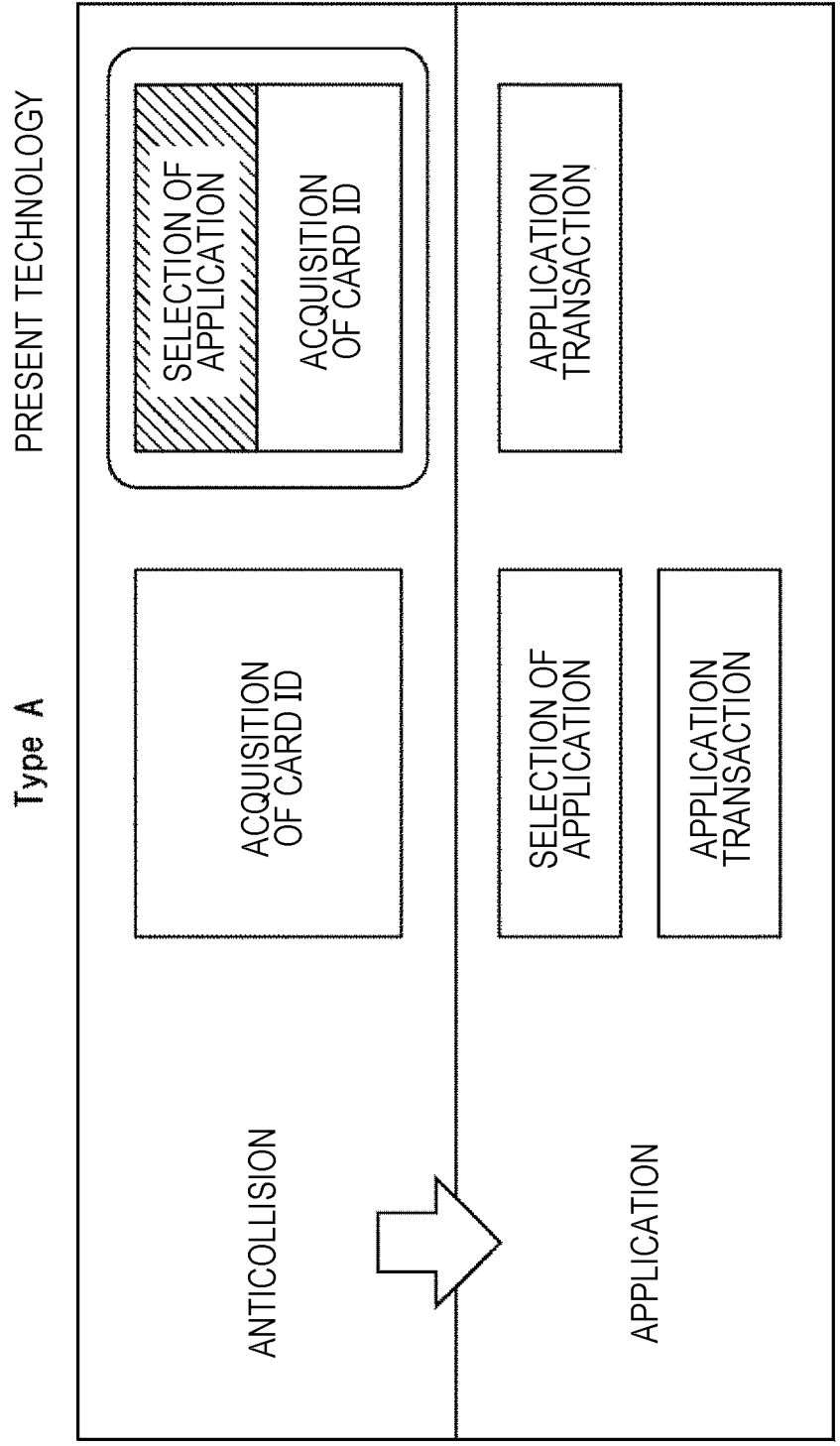
FIG. 3 is an explanatory diagram illustrating an overview of the present technology.

Here, as illustrated in FIG. 3, an anticollision process is performed to acquire the card IDs in Type A. Anticollision is a structure in which the IC card 1 having the same value (card ID) as bits of the UID sent from the IC card processing device 2 replies.

Accordingly, in the present technology, only the IC card 11 with 2 bytes is caused to reply by designating first 2 bytes (application) in advance from the IC card processing device 2 (as application identification information used in an application layer) using this structure.

Thus, selection of an application and acquisition of a card ID can be realized by performing a small change (sending of first 2 bytes in advance) in a known anticollision process of Type A, and thus an application transaction can be performed at an early timing. Note that, for example, the selection of an application and the acquisition of a card ID are performed by, for example, an application selection unit or a card ID acquisition unit configured on a memory when the control device 21 in FIG. 1 executes a predetermined program.

Figure 4:
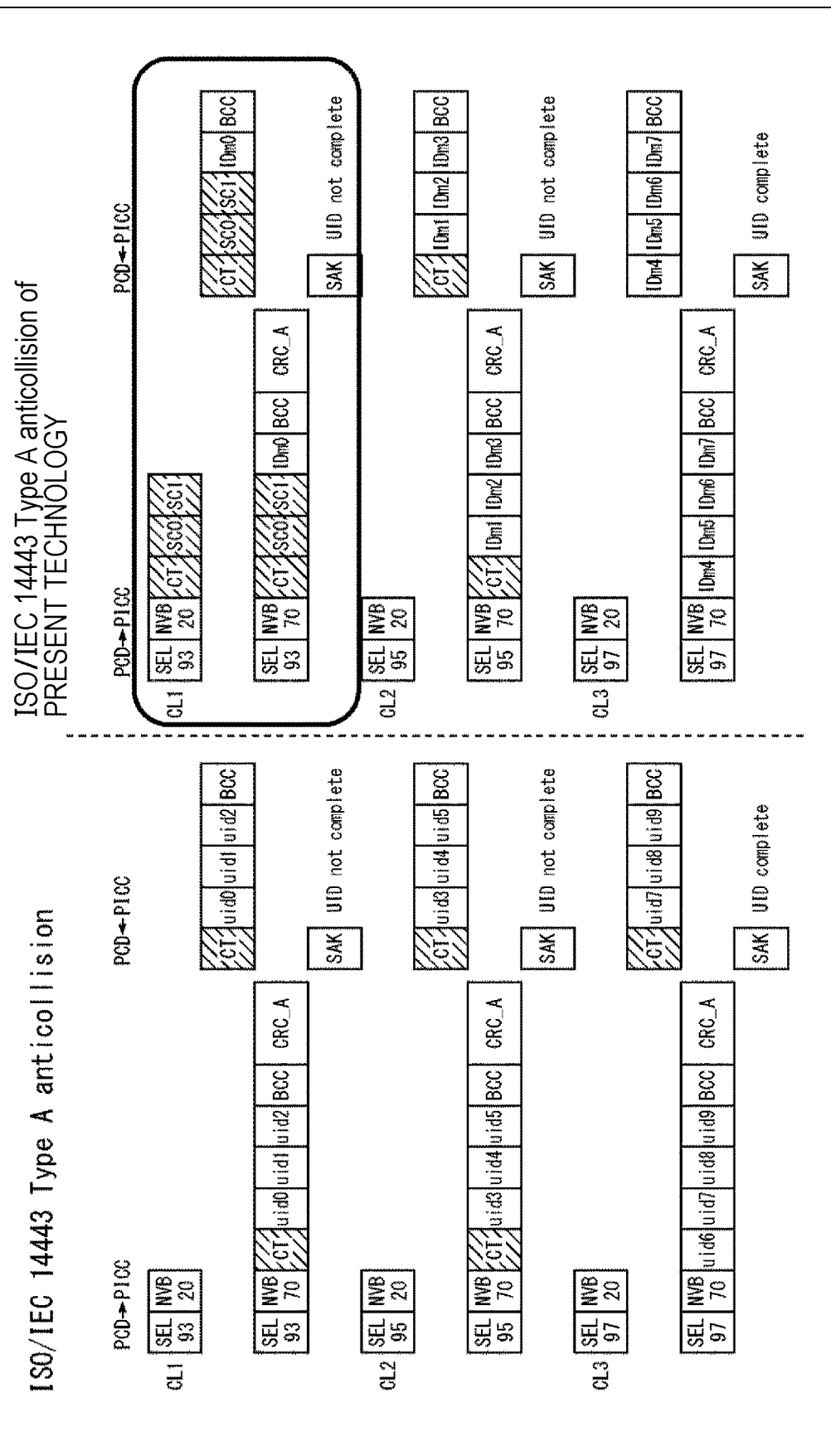
FIG. 4 is an explanatory diagram illustrating an overview of the present technology.

In addition, in the present technology, as illustrated in FIG. 4, a value of a system code (SC) with 2 bytes which is identification information of an application is designated with a first command in an anticollision process performed between a PCD (the IC card processing device 2) and a PICC (the IC card 1). Thus, IDm which is a card ID is specified by causing only the IC card 1 with the same value of the SC to be able to reply and performing the remaining anticollision process in this state.

Hereinafter, detailed description will be made.

3. Anticollision Process of Type A

In the IC card processing device 2, a process described in FIG. 5 below is necessary from selection of the IC card 1 to selection of an application (in a case of a cascade level CL=3).

Figure 5:
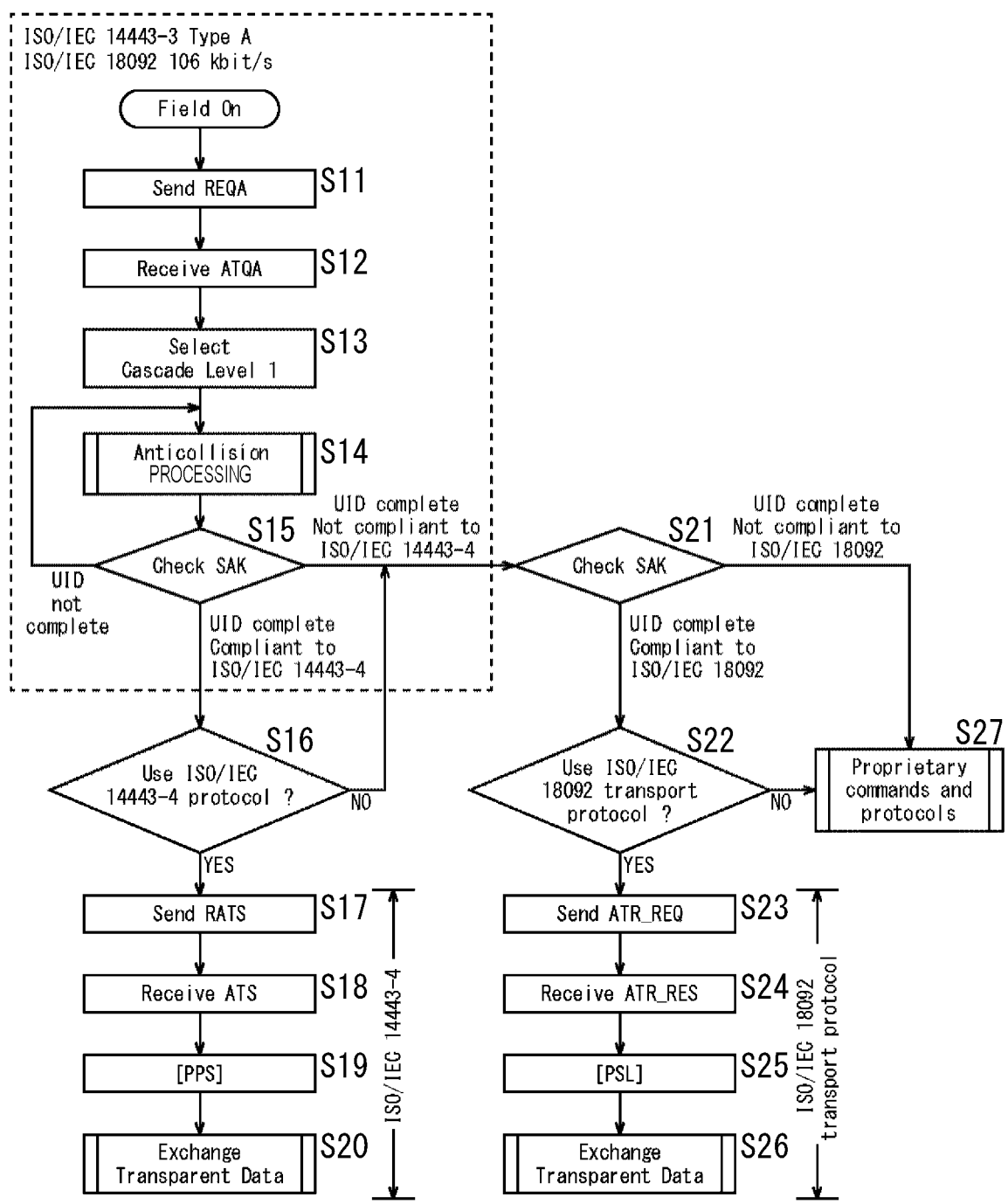
FIG. 5 is an explanatory flowchart illustrating a detailed process from initialization of Type A to an application transaction.

The flowchart in FIG. 5 shows a detailed process from initialization of Type A to an application transaction in the IC card processing device 2. A number in [ ] corresponds to a number in FIG. 5.

In the IC card processing device 2, after field ON, a polling process is performed in steps S11 and S12. In other words, in step S11, the IC card processing device 2 sends REQA or WUPA illustrated in A of FIG. 6. In A of FIG. 6, REQA includes a start bit, "0110010", and an end bit. On the other hand, the IC card 1 sends ATQA when REQA or WUPA is received.

In step S12, the IC card processing device 2 receives ATQA illustrated in B of FIG. 6. In B of FIG. 6, ATQA includes 4-bit reserved for future use (RFU), 4-bit prorietary coding, a 2-bit UID size bit frame, 1-bit RFU, and 5-bit frame anticollision.

In step S13, the IC card processing device 2 selects cascade level 1 (CL1). C of FIG. 6 illustrates a table showing a relation between UID sizes and cascade levels. The table in C of FIG. 6 shows the UID size with single (4 bites) and CL1 when b8=0 and b7=0. The table shows the UID size with double (7 bites) and CL2 when b8=0 and b7=1. The table shows the UID size with triple (10 bites) and CL3 when b8=1 and b7=0. The table shows the UID size with RFU and not applicable (n/a) when b8=0 and b7=1.

In step S14, the IC card processing device 2 sends an anticollision command and performs an anticollision process of acquiring UID. The anticollision process will be described with reference to FIG. 7.

Figure 7:
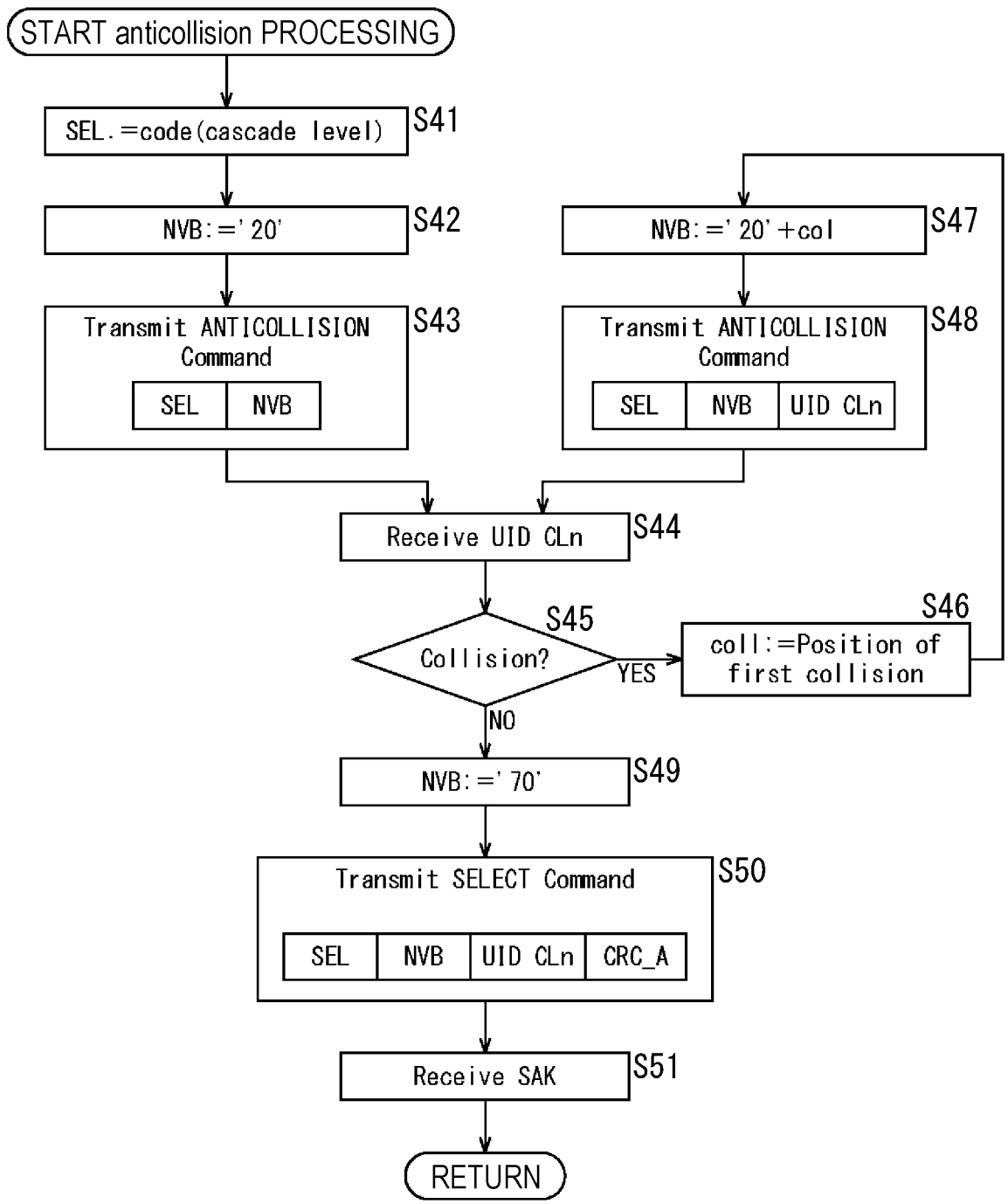
FIG. 7 is an explanatory flowchart illustrating an anticollision process of step S14 of FIG. 5.

Since the IC card processing device 2 does not first know the value of UID that the IC card 1 has, the IC card processing device 2 selects SEL='93' in step S41 of FIG. 7, sets NVB='20' in step S42, and sends an anticollision command of SEL='93' and NVB='20' and requests UID of the IC card 1 in step S43.

A of FIG. 8 is a diagram illustrating an example in which the IC card processing device 2 sends a first anticollision command in each CL.

As illustrated in A of FIG. 8, at the time of CL1, SEL='93,' NVB='20,' and parameter=empty are sent. At the time of CL2, SEL='95,' NVB='20,' and parameter=empty are sent. At the time of CL3, SEL='97,' NVB='20,' and parameter=empty are sent.

The IC card 1 within an RF field receiving it sends UID and BCC (a sum of 5 bytes). If UID is 4 bytes, 4 bytes is sent. If UID is 7 bytes or 10 bytes, the beginning 3-byte UID is sent after a 1-byte cascade tag (CT). Note that BCC is data for error detection calculated from 4 bytes replied immediately previously.

B of FIG. 8 illustrates an example of anticollision data sent by the IC card 1 at the time of each CL. Note that 10-byte UID is configured by connecting uid0 to uid9.

In other words, CL1 includes CT, uid0, uid1, uid2, and BCC, each having 1 byte. CL2 includes CT, uid3, uid4, uid5, and BCC, each having 1 byte. CL3 includes uid6, uid7, uid8, uid9, and BCC, each having 1 byte.

In a case where only one IC card is within the RF field, no collision occurs and the IC card processing device 2 can correctly receive all the bits of UID of the IC card 1. However, in a case where the plurality of IC cards 1 is within the RF field, the plurality of IC cards 1 sends UID. Therefore, collision occurs at bit positions with different values.

In step S45, the IC card processing device 2 determines whether or not collision occurs. In a case where it is determined in step S45 that collision occurs, the process proceeds to step S46. The IC card processing device 2 acquires the position of first collision in step S46 and adds the position obtained in step S46 to NVB='20' to newly set addition of the position to NVB='20' in step S47. In step S48, the IC card processing device 2 adds any 1 bit to the bits of SEL='93,' the newly set NVB, and UID, sends an anticollision command, and requests UID of the IC card 1.

In a case where it is determined in step S45 that no collision occurs, the IC card processing device 2 sends NVB as a SELECT command (NVB='70') in step S49 and sends the SELECT command (NVB='70') in step S50 to enter a state in which the IC card 1 is selected. The IC card 1 replies with SAK. Therefore, the IC card processing device 2 receives SAK in step S51 and ends the anticollision process of FIG. 7, and then the process proceeds to step S15 of FIG. 5.

FIG. 9 is a diagram illustrating an example of SAK.

In the example of FIG. 9, SAK is configured with 8 bits of b8 to b1. SAK in a case where only b3 is 1 and the others are any value means "Cascade bit set: UID not complete". SAK in a case where only b3 is 0, only b6 is 1, and the others may be any value means "UID complete, PICC compliant with ISO/IEC 14443-4". A SELECT command in a case where b3 and b6 are 0 and the others may be any value means "UID complete, PICC not compliant with ISO/IEC 14443-4".

In step S15, the IC card processing device 2 checks b3 of SAK, returns the process to step S14 when SAK means UID not complete, and performs the anticollision process at a later cascade level. A cascade level at which it is necessary to perform the anticollision process is indicated as a cascade level in accordance with a value (the number of times CL and the SELECT command are necessary) by acquiring a UID size bit frame in b8 and b7 of ATQA received in step S12.

If SAK means UID complete and compliance with ISO/IEC 14443-4 in step S15, the process proceeds to step S16. In step S16, the IC card processing device 2 determines whether or not to use the protocol of ISO/IEC 14443-4. If it is determined in step S16 that the protocol of ISO/IEC 14443-4 is used, the process proceeds to step S17. In steps S17 to S19, a protocol activation process of ISO/IEC 14443-4 is performed.

In other words, as the protocol activation process of ISO/IEC 14443-4, the IC card processing device 2 sends RATS in step S17 and receives ATS in step S18. In step S19, the IC card processing device 2 requests PPS and receives a PPS response sent in response to the request in step S19 (in a case where PPS is supported). Then, in step S20, as a transparent data exchanging process (application transaction), the IC card processing device 2 selects an application by a SELECT command in a case of being compliant with ISO/IEC 7816-4.

Figure 10:
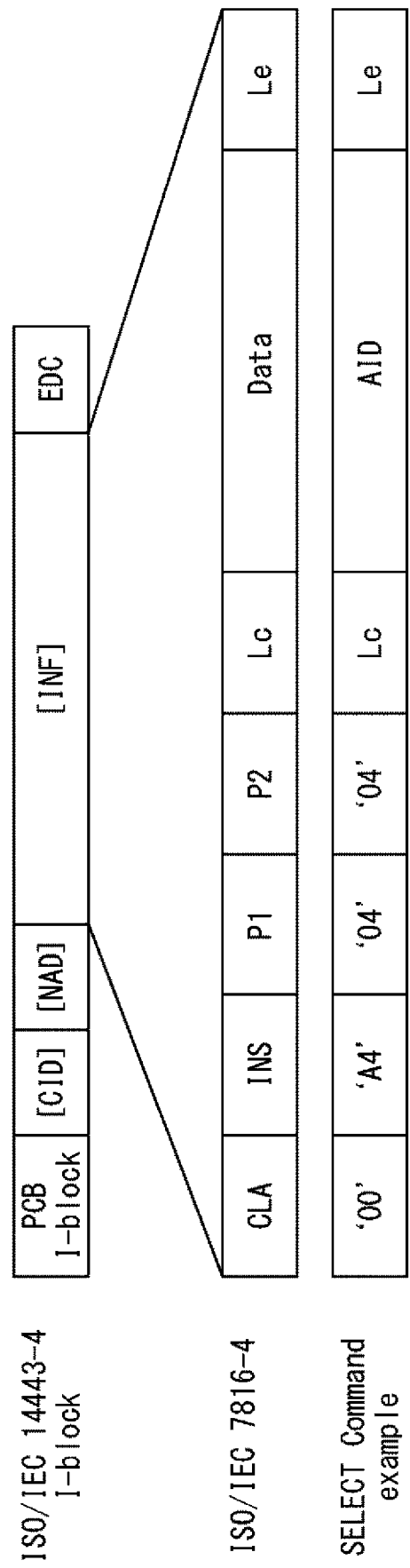
FIG. 10 is a diagram illustrating an exemplary format of a SELECT command for performing application selection.

FIG. 10 is a diagram illustrating an exemplary format of a SELECT command for performing application selection.

Conversely, in a case where SAK means UID complete and not compliant with ISO/IEC 14443-4 in step S15 and in a case where the IC card processing device 2 does not use the protocol of ISO/IEC 14443-4 in step S16, the process proceeds to step S21.

In step S21, the IC card processing device 2 checks SAK to determine whether or not SAK means UID complete and compliant with ISO/IEC 18092. In a case where it is determined in step S21 that SAK means UID complete and compliant with ISO/IEC 18092, the process proceeds to step S22.

In step S22, the IC card processing device 2 determines whether or not to use a transport protocol of ISO/IEC 18092. In a case where it is determined in step S22 that the transport protocol of ISO/IEC 18092 is used, the process proceeds to step S23 and a transport protocol activation process of ISO/IEC 18092 is performed in steps S23 to S25.

That is, as the transport protocol activation process of ISO/IEC 18092, the IC card processing device 2 sends ATR_REQ in step S23 and receives ATR_RES in step S24. In step S25, the IC card processing device 2 requests PSL_REQ and receives PSL_RES sent in response to the request. Then, in step S26, the IC card processing device 2 may select an application as a transparent data exchanging process (application transaction).

In a case where it is determined in step S21 that SAK means UID complete and not compliant with ISO/IEC 18092 or a case in which it is determined in step S22 that the transport protocol of ISO/IEC 18092 is not used, the process proceeds to step S27. In step S27, a proprietary protocol is used as the selection of the application and the application transaction.

4. First Embodiment (A1)

A first embodiment (A1) of the present technology is an example in which a case in which identification information of an application has a 2-byte length (referred to as a system code (SC)) and identification information unique to an IC card has an 8-byte length (referred to as a manufacturing ID (IDm)) is assumed using Type A as a base. In the first embodiment, to adapt a total of 10 bytes to an anticollision process of Type A, anticollision of cascade level 3 (CL3) is performed.

Figure 11:
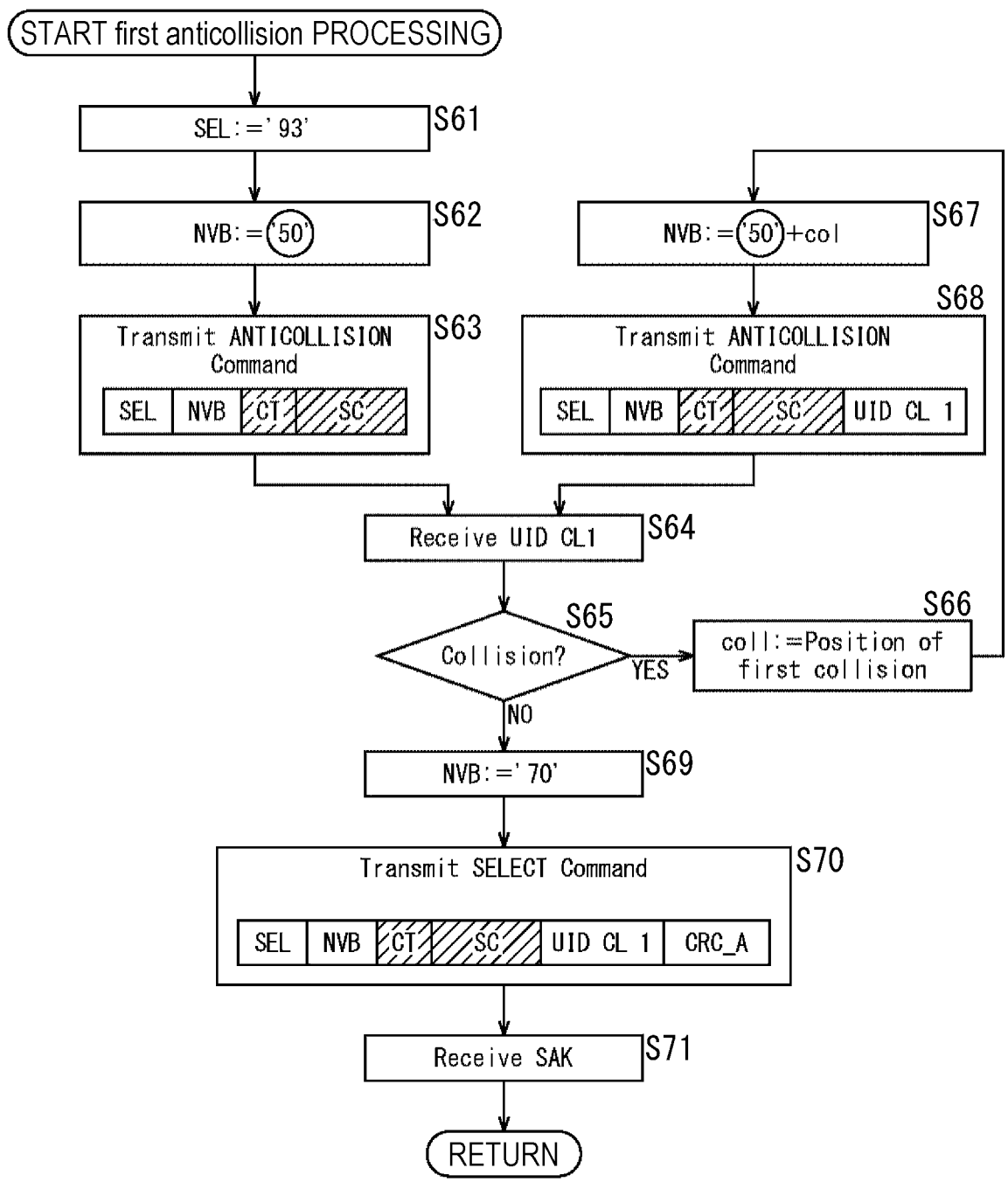
FIG. 11 is an explanatory flowchart illustrating an anticollision process according to a first embodiment (A1) of the present technology.

In the anticollision process of Type A described above with reference to FIGS. 5 to 10, a specific UID value is not sent by designating NVB='20' with the first command. However, as illustrated in FIG. 11, 8-byte IDm is acquired by designating the value of the 2-byte system code (SC) with the first command, causing only the IC card 1 with the same value of the SC to be able to reply, and performing the remaining anticollision process in this state. To realize this, the first command is changed from the known standard, '50' (a 5-byte length) is designated in NVB, and a CT and a 2-byte SC are designated in parameter.

Next, the anticollision process according to the first embodiment (A1) will be described with reference to FIG. 11.

The IC card processing device 2 selects SEL='93' in step S61, sets NVB='50' in step S62, and sends an anticollision command of and SEL='93,' NVB='50,' the CT, and the SC and requests UID of the IC card 1 in step S63.

Figure 12:
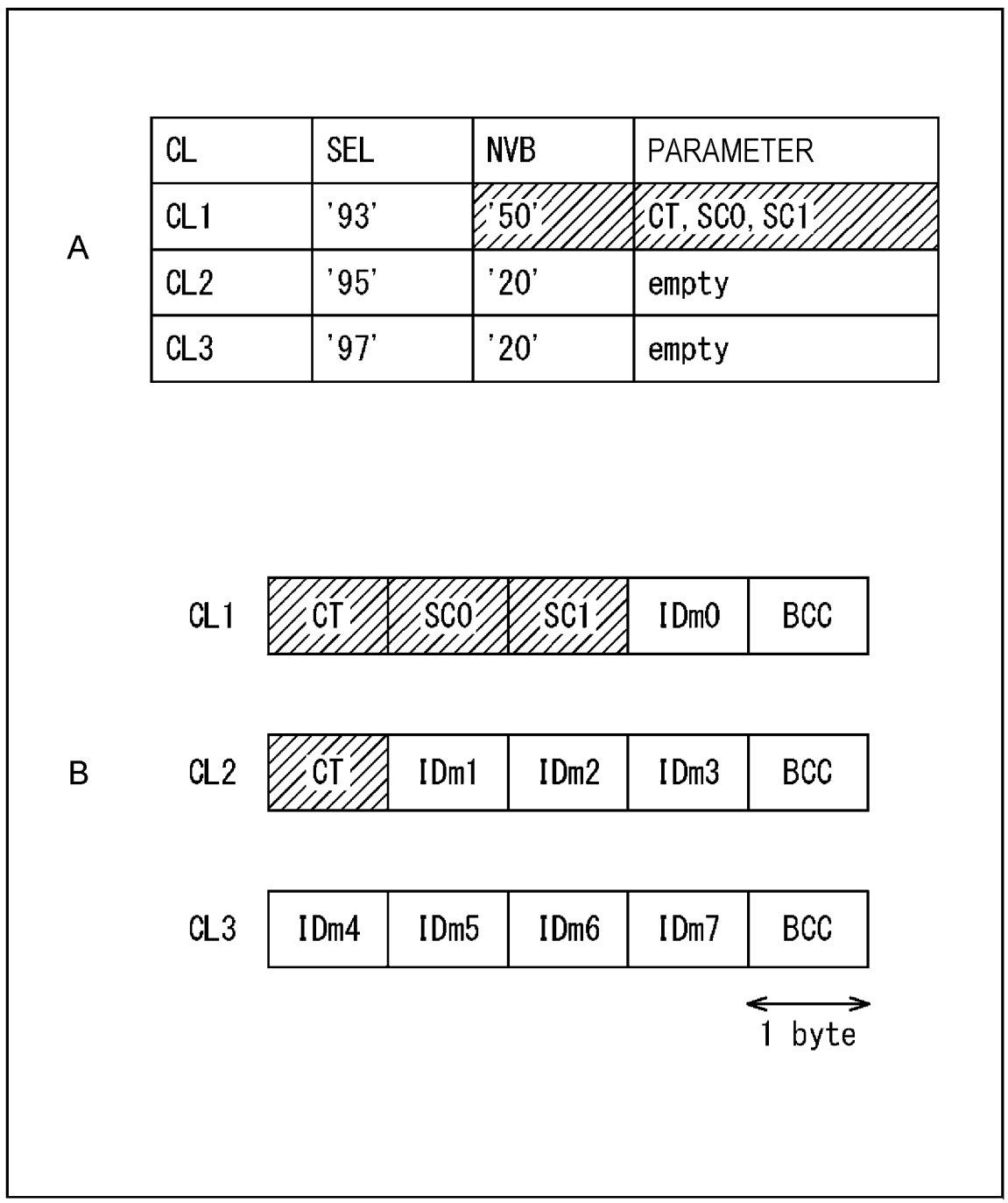
FIG. 12 is a diagram illustrating an example of a first anticollision command and anticollision data.

A of FIG. 12 is a diagram illustrating an example in which the IC card processing device 2 sends a first anticollision command in each CL.

As illustrated in A of FIG. 12, as a command to be sent at first in each CL, at the time of CL1, SEL='93,' NVB='50,' and parameter=CT, SO0, SC1 are sent. At the time of CL2, SEL='95,' NVB='20,' and parameter=empty are sent. At the time of CL3, SEL='97,' NVB='20,' and parameter=empty are sent.

The IC card 1 within an RF field receiving it sends anticollision data illustrated in B of FIG. 12. Note that BCC is data for error detection calculated from 4 bytes replied immediately previously.

B of FIG. 12 illustrates an example of anticollision data sent by the IC card 1 at the time of each CL. Note that the SC is configured by connecting SC0 and SC1 and IDm is configured by connecting IDm0 to IDm7.

That is, CL1 includes CT, SC0, SC1, IDm0, and BCC, each having 1 byte. CL2 includes CT, IDm1, IDm2, IDm3, and BCC, each having 1 byte. CL3 includes IDm4, IDm5, IDm6, IDm7, and BCC, each having 1 byte.

In a case where only one IC card is within the RF field, no collision occurs and the IC card processing device 2 can correctly receive all the bits of UID of the IC card 1. However, in a case where the plurality of IC cards 1 is within the RF field, the plurality of IC cards 1 sends UID. Therefore, collision occurs at bit positions with different values.

In step S65, the IC card processing device 2 determines whether or not collision occurs. In a case where it is determined in step S65 that collision occurs, the process proceeds to step S66. The IC card processing device 2 acquires the position of first collision in step S66 and adds the position obtained in step S66 to NVB='50' to newly set an NVB value in step S67. In step S68, the IC card processing device 2 adds any 1 bit to the bits of SEL='93,' the newly set NVB, CT, SC, and UID, sends an anticollision command, and requests UID of the IC card 1.

In a case where it is determined in step S65 that no collision occurs, the IC card processing device 2 sends NVB as a SELECT command (NVB='70') in step S69 and sends the SELECT command (NVB='70', CT, SC) in step S70 to enter a state in which the IC card 1 is selected. The IC card 1 replies with SAK. Therefore, the IC card processing device 2 receives SAK in step S71 and ends the anticollision process of FIG. 11, and then the process proceeds to step S15 of FIG. 5. Note that the anticollision process of CL2 and CL3 are to be performed according to FIG. 7 described above.

As described above, when the anticollision process is completed, the IC card processing device 2 completes the selection of the application and the acquisition of IDm by designating the SC. Thereafter, in steps S20, S26, and S27 of FIG. 5 described above, a transaction of the application can be exchanged.

Note that in step S20, the application may be selected with a SELECT command for ISO/IEC 7816-4 definition.

5. Second Embodiment (A2)

A second embodiment (A2) of the present technology is a modification of the first embodiment (A1) of the present technology. A SEL value (RFU value) in CL1 in A of FIG. 12 is set to '9F' (a predetermined value). Thus, the first anticollision command can be distinguished from Type A.

Figures 13, 14:
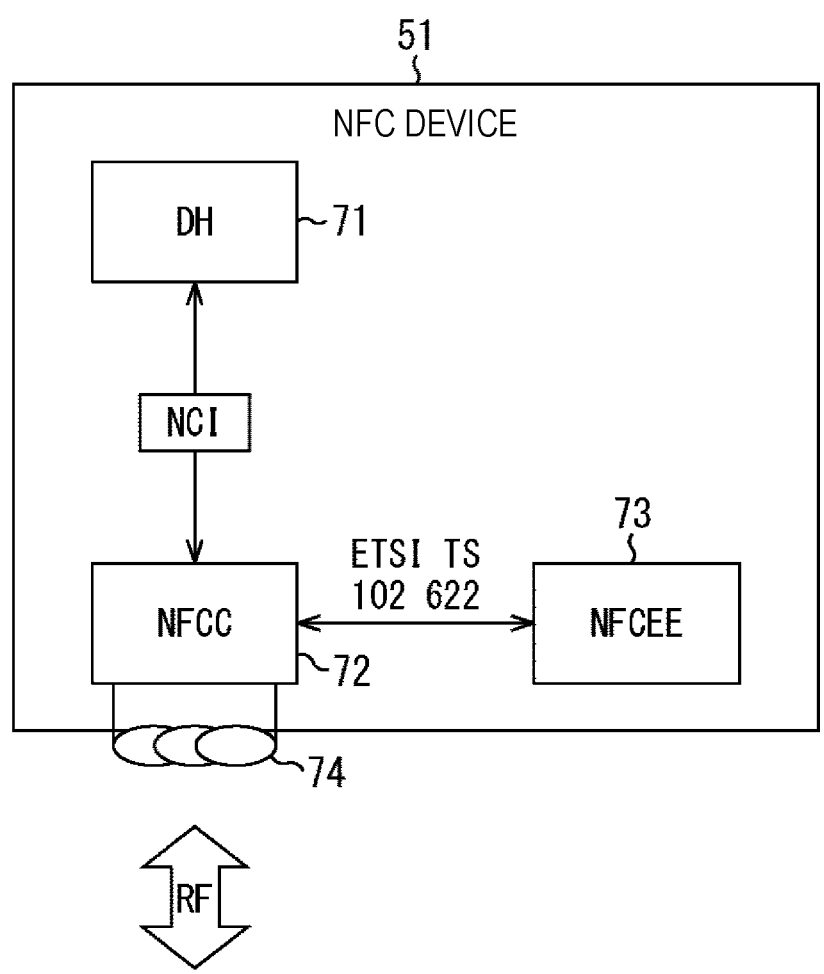
FIG. 13 is a diagram illustrating an example of a first anticollision command according to a second embodiment (A2) of the present technology.
FIG. 14 is a block diagram illustrating an exemplary main configuration of an NFC device.

FIG. 13 is a diagram illustrating an example in which the IC card processing device 2 sends a first anticollision command in each CL according to a second embodiment (A2) of the present technology.

As illustrated in FIG. 13, as a command to be sent at first in each CL, at the time of CL1, SEL='9F,' NVB='50,' and parameter=CT, SC0, SC1 are sent. At the time of CL2, SEL='95,' NVB='20,' and parameter=empty are sent. At the time of CL3, SEL='97,' NVB='20,' and parameter=empty are sent.

In the case of the example of FIG. 13, since the SEL value is different from the viewpoint of the IC card processing device 2, it can be recognized that the system code is included in the parameter.

In a case where the UID size is double or triple in ISO/IEC 14443-3, a beginning 1 byte is defined as a unique value of a manufacturer. Therefore, as a method of avoiding this, an example of the second embodiment is also useful. That is, the beginning 1 byte can be freely used as a part of the system code.

Note that the IC card 1 is configured to include the NFC device 51, as described above with reference to FIG. 1. In the second embodiment, however, a case where the NFC device 51 that has a configuration illustrated in FIG. 14 operates in a card emulation mode will be described.

In an example of FIG. 14, the NFC device 51 includes one device host (DH) 71, one NFC controller (NFCC) 72, and zero or more NFC execution environment (NFCEE) 73. Since the number of NFCEEs 73 is 0 or more, the number of NFCEEs may be 0 (the NFCEE may be omitted).

The DH 71 controls the entire NFC device 51, generates a command (CMD) for controlling the NFCC 72, and interprets an execution result of the command. The DH 71 exchanges a message with the NFCC 72 in conformity with an NFC controller interface (NCI). In addition, the DH 71 executes an application that exchanges data with a remote target. As the application, for example, there is an application or the like that performs a data exchanging process for a name card or an address book using peer-to-peer (P2P) communication, an electronic money settlement process using communication between a reader-writer and an IC card, and the like.

The NFCC 72 is an interface that is disposed in the middle of the DH 71 and a remote target and mediates between the DH 21 and the remote target and performs route control so that the DH 71 or the NFCEE 73 can exchange data with the remote target. The NFCC 72 has a plurality of interface levels as levels of the interface that mediates between the DH 71 and the remote target. The NFCC 72 exchanges a message with the DH 71 in conformity with the NCI and performs sending and reception of RF data via the antenna 74 on the basis of a command (CMD) from the DH 71.

The NCI is a logical interface between the DH 71 and the NFCC 72. In the NCI, a command (CMD) with a predetermined format, notification (NTF), and the like are defined.

The NFCEE 73 processes and retains secure data among processes necessary for the NFC device 51 to exchange data with the remote target. In the example of FIG. 14, one NFCEE 73 is provided inside the NFC device 51. The NFCEE 73 is connected to the NFCC 72, and retains and processes secure data handled by the NFCC 72. The number of NFCEEs 73 necessary in the NFC device 51 can be provided and the NFCEE 73 may be omitted as unnecessary.

The antenna 74 includes a closed loop coil and outputs electromagnetic waves (RF data) by changing a current flowing in the coil.

In a case where the NFC device 51 that has the configuration illustrated in FIG. 14 operates in the card emulation mode, the NFCC 72 processes an anticollision command. Therefore, it is necessary to set a parameter included in a response corresponding to the anticollision command in advance in the NFCC 72.

In a case where one or more NFCEEs 73 are connected to the NFCC 72, an application transaction is processed by the DH 71 and the NFCEE 73. A structure for determining that the DH 71 or the certain NFCEE 73 processes the application transaction is referred to as routing.

After the anticollision process is completed, a later RF frame is transferred in accordance with setting of the routing.

The routing process and the preliminary setting performed by the NFCC 72 are defined with an NFC controller interface (NCI) technical specification of the NFC Forum standard.

A parameter returned in the anticollision of Type A of ISO/IEC 14443-4 is defined as Listen A Parameter. A comparison target of a parameter designated with an anticollision command of SEL='9F' can be set by adding LA_SC (2-byte length) as one of the parameters.

In a case where a SELECT command of cascade level 3 continuing in the anticollision command is completed, when there is a matching SC from SC RouteList set as a routing entry, a route corresponding to the SC is set. Thus, a frame received from a later RF is transferred to the route. Note that SC RouteList can be set using an RF_SET_LISTEN_MODE_ROUTING_CMD command in the NFCC 72 from the DH 71.

In addition, in a case where the NFCEE is an HCI host (for example, UICC) in the ETSI standard, a comparison target of a parameter designated with the anticollision command of SEL='9F' can be set by adding the SC (2-byte length) to card RF gate for RF technology Type A registry defined in ETSI TS 102 622.

FIG. 15 is a diagram illustrating a value field in a case where routing of a system code (SC) is set.

The value field includes a route, a power state, and a route list. The route stores a 1-octet NFCEE ID for the route of a route destination. The power state stores a condition of the power state to which the routing setting is applied with a 1-octet length. The SC route list stores a connection list of n SCs (2 bytes) with a 2n-octet length at ($1 \leq n \leq 32$). Note that FFFFh is not usable in the SC.

LA_SC of the foregoing Listen A Parameters and the SC of the registry of card RF gate for RF technology Type A are defined as a list of the system codes as n x 2 bytes length. When a first command of anticollision of CL1 is received, the matching command may be searched for from the list of the system codes.

6. Third Embodiment (A11)

In a third embodiment (A11) of the present technology, an application identification information (AI: Application Identity) to be first transmitted is generalized in the first embodiment (A1) and the second embodiment (A2) of the present technology.

In the first embodiment (A1) and the second embodiment (A2) of the present technology, 2-byte application identification information is first transmitted, but it is unnecessary to fix the application identification information to 2 bytes. The application identification information may have 1 byte or 4 bytes.

FIG. 16 is a diagram illustrating a case where application identification information is transmitted. In ISO/IEC 14443-3, application identification information which can be designated to the maximum is 6 bytes since CL1 to CL3 are defined and the minimum byte length of UID is 4 bytes.

As illustrated in FIG. 16, in the case of NVB='40' at SEL='9F' in CL1, parameters are CT and AI0. In the case of NVB='50' at SEL='9F' in CL1, parameters are CT, AI0, and AI0. In the case of NVB='60' at SEL='9F' in CL1, parameters are CT, AI0, AI0, and AI2.

In the case of NVB='20' at SEL='95' in CL2, parameters are empty. In the case of NVB='40' at SEL='95' in CL2, parameters are CT and AI3. In the case of NVB='50' at SEL='95' in CL2, parameters are CT, AI3, and AI4. In the case of NVB='60' at SEL='95' in CL2, parameters are CT, AI3, AI4, and AI5.

In the case of NVB='20' at SEL='97' in CL3, parameters are empty.

By extending CL3 up to CL7, it is possible to transmit the application identification information of up to 16 bytes. FIG. 17 is a diagram illustrating another case where application identification information is transmitted.

As illustrated in FIG. 17, in the case of NVB='40' at SEL='9F' in CL1, parameters are CT and AI0. In the case of NVB='50' at SEL='9F' in CL1, parameters are CT, AI0, and AI1. In the case of NVB='60' at SEL='9F' in CL1, parameters are CT, AI0, AI1, and AI2.

In the case of NVB='20' at SEL='95' in CL2, parameters are empty. In the case of NVB='40' at SEL='95' in CL2, parameters are CT and AI3. In the case of NVB='50' at SEL='95' in CL2, parameters are CT, AI3, and AI4. In the case of NVB='60' at SEL='95' in CL2, parameters are CT, AI3, AI4, and AI5.

In the case of NVB='40' at SEL='95' in CL3, parameters are CT and AI6. In the case of NVB='50' at SEL='97' in CL3, parameters are CT, AI6, and AI7. In the case of NVB='60' at SEL='97' in CL3, parameters are CT, AI6, AI7, and AI8.

In the case of NVB='20' at SEL='99' in CL4, parameters are empty. In the case of NVB='40' at SEL='99' in CL4, parameters are CT and AI9. In the case of NVB='50' at SEL='99' in CL4, parameters are CT, AI9, and AI10. In the case of NVB='60' at SEL='99' in CL4, parameters are CT, AI9, AI10, and AI1.

In the case of NVB='20' at SEL='9B' in CL5, parameters are empty. In the case of NVB='40' at SEL='9B' in CL5, parameters are CT and AI12. In the case of NVB='50' at SEL='9B' in CL5, parameters are CT, AI12, and AI13. In the case of NVB='60' at SEL='9B' in CL5, parameters are CT, AI12, AI13, and AI14.

In the case of NVB='20' at SEL='9D' in CL6, parameters are empty. In the case of NVB='40' at SEL='9D' in CL6, parameters are CT and AI15.

In the case of NVB='20' at SEL='90' in CL7, parameters are empty.

For example, in a case where 10-byte AIs (AI0 to AI9) are transmitted or a case where 16-byte AIs of CL1 to CL5 are transmitted, it is necessary to transmit each anticollision command of CL1 to CL7.

Figure 18:
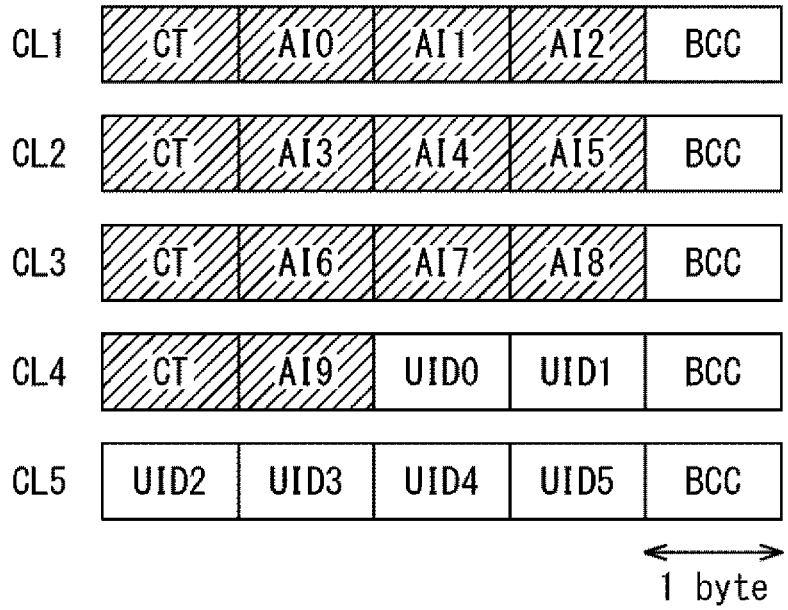
FIG. 18 is a diagram illustrating an exemplary configuration of each cascade level in a case where application identification information with 10 bytes is designated.

FIG. 18 is a diagram illustrating an exemplary configuration of each cascade level in a case where application identification information with 10 bytes is designated.

That is, CL1 includes CT, AI0, AI1, AI2, and BCC, each having 1 byte. CL2 includes CT, AI3, AI4, AI5, and BCC, each having 1 byte. CL3 includes CT, AI6, AI7, AI8, and BCC, each having 1 byte. CL4 includes CT, AI9, UID0, UID1, and BCC, each having 1 byte. CL5 includes UID2, UID3, UID4, UID5, and BCC, each having 1 byte.

Figure 19:
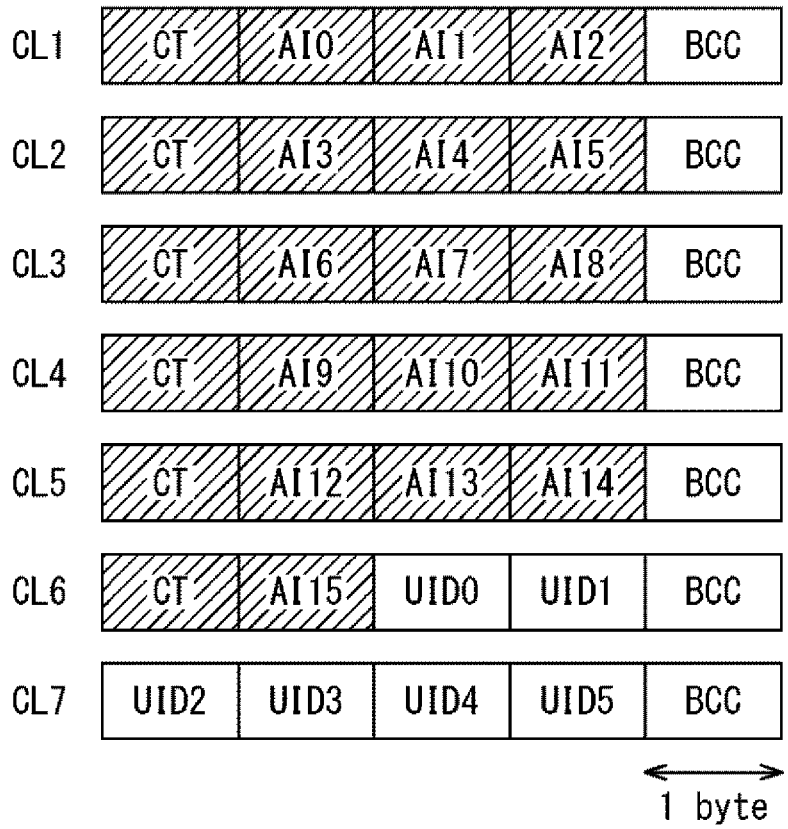
FIG. 19 is a diagram illustrating an exemplary configuration of each cascade level in a case where application identification information with 16 bytes is designated.

FIG. 19 is a diagram illustrating an exemplary configuration of each cascade level in a case where application identification information with 16 bytes is designated.

That is, CL1 includes CT, AI0, AI1, AI2, and BCC, each having 1 byte. CL2 includes CT, AI3, AI4, AI5, and BCC, each having 1 byte. CL3 includes CT, AI6, AI7, AI8, and BCC, each having 1 byte. CL4 includes CT, AI9, AI10, AI11, and BCC, each having 1 byte. CL5 includes CT, AI12, AI13, AI14, and BCC, each having 1 byte. CL6 includes CT, AI15, UID0, UID1, and BCC, each having 1 byte. CL7 includes UID2, UID3, UID4, UID5, and BCC, each having 1 byte.

7. Fourth Embodiment (A3)

In a fourth embodiment (A3), a case in which application identification information is the following information will be assumed:
1. AFI (1-byte length) for ISO/IEC 14443-3 definition;
2. SC (2-byte length) for JIS X 6319-4 definition; and
3. AID (5 to 16-byte length) for ISO/IEC 7816-4 definition.

In a polling process in steps S11 and S12 of FIG. 5, a 7-bit short frame is used, but a new polling command in which a standard frame is used is added. At this time, the polling command includes a parameter of the foregoing application identification information with 1 byte or more and only the IC card 1 that has the same application identification information can reply. Then, in this state, the anticollision process (steps S13 to S15 of FIG. 5) is performed to specify UID.

After UID is specified, selection of the application is completed. Therefore, thereafter, a transaction of the application in steps S20, S26, and S27 of FIG. 5 described above can be exchanged.

Figure 20:
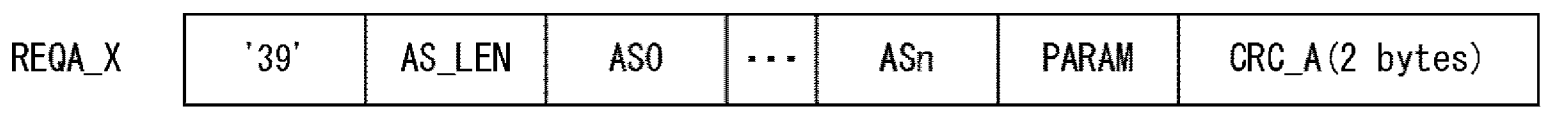

In the polling process, an extended polling command REQA_X in which a standard frame is used is defined, as illustrated in FIG. 20.

REQA_X is a command for selecting an application with the application identification information designated with AS0 to ASn and includes AS_LEN indicating the length of the application identification information, AS0 to ASn storing the application identification information, and PARAM.

The IC card 1 recognizes which application identification information in 1. to 3. is designated using a value of AS_LEN, compares the application identification information with application information in the IC card 1, and replies with ATQA_X when the information matches each other.

In addition, as illustrated in FIG. 21, three classified commands may be defined.

REQA_X1 is a command for selecting application by AFI and includes a 1-byte parameter PX1. REQA_X2 is a command for selecting an application by the SC and includes a 1-byte parameter PX2. The SC includes SC0 and SC1. REQA_X3 is a command for selecting application by AID and includes a 1-byte parameter PX3. AID includes ADI0 to Ain and the length is given with AID_LEN.

In the case of the example of FIG. 21, the IC card 1 recognizes which application identification information in 1. to 3. is designated using the received first byte, compares the application identification information with application information in the IC card 1, and replies with ATQA_X when the information matches each other.

The response ATQA_X to the extended polling command is defined as in FIG. 22. Note that the first and second bytes are defined as in the known ATQA, as illustrated in FIG. 23. AP_L stores a length from ATQAP0 to ATQAPn.

Figure 24:
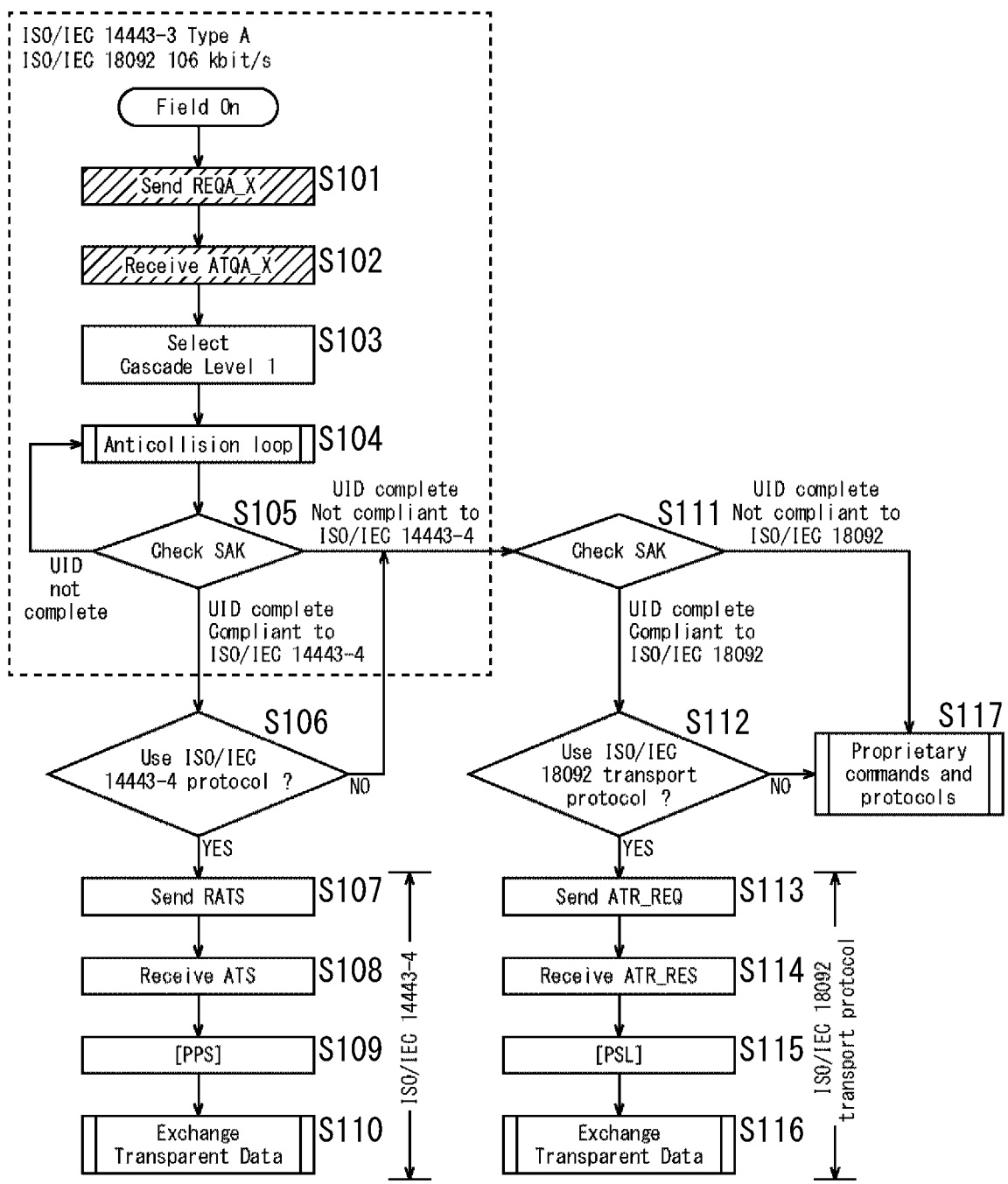
FIG. 24 is an explanatory flowchart illustrating a detailed process from initialization to an application transaction when the extended polling command REQA_X and ATQA_X are used.

The flowchart of FIG. 24 illustrates an example when the extended polling commands REQA_X and ATQA_X in FIG. 5 are used.

The IC card processing device 2 performs a polling process in steps S101 and S102 after field ON. That is, the IC card processing device 2 sends REQA_X in step S101. On the other hand, when the IC card 1 receives REQA_X, ATQA_X is sent.

In step S102, the IC card processing device 2 receives ATQA_X.

Note that since processes basically similar to those of steps S13 to S27 of FIG. 5 are performed in steps S103 to S117 of FIG. 24, the description thereof will be omitted.

As described above, when REQA_X is sent and ATQA_X is received, the selection of the application is completed. Thereafter, by performing the known anticollision process and specifying one IC card 1, it is possible to perform a transaction of the application. In accordance with the value of SAK, the application process is performed in steps S110 (ISO/IEC 14443-4), S116 (ISO/IEC 18092 transport protocol), and S117 (Proprietary commands and protocols).

Here, in the case where the NFC device 51 that has the configuration described above in FIG. 14, as in the second embodiment is used as the IC card 1, parameters of LA_AFI (1-byte length) and LA AID (16-byte length) of Listen A Parameters and AFI (1-byte length) and AID (16-byte length) of the registry of card RF gate for RF technology Type A are necessary in addition to the set parameters (LA_SC of Listen A Parameters and SC of the registry of card RF gate for RF technology Type A) described with reference to FIG. 15. In a case where REQA_X, REQA_X1, REQA_X2, and REQA_X3 are received, the above-described parameters are evaluated in the NFC device 51.

8. Fifth Embodiment (A4)

A fifth embodiment (A4) of the present technology is a modification of the fourth embodiment (A3) of the present technology. In the fifth embodiment (A4) of the present technology, REQA_X has a similar configuration as that of the fourth embodiment (A3) and ATQA_X is configured to include UID or protocol information.

FIG. 25 is a diagram illustrating an exemplary format of ATQA_X according to the fifth embodiment (A4) of the present technology. In FIG. 25, ATQA_X includes ATQA_X0, ATQA_XO2, SAK, AP_L, AP0 to APn, and CRC A (2 bytes) side by side from the left.

Here, AP_L stores a length of AP0 to APn. Protocol information is stored in SAK and UID is stored in AP0 to APn.

Figure 26:
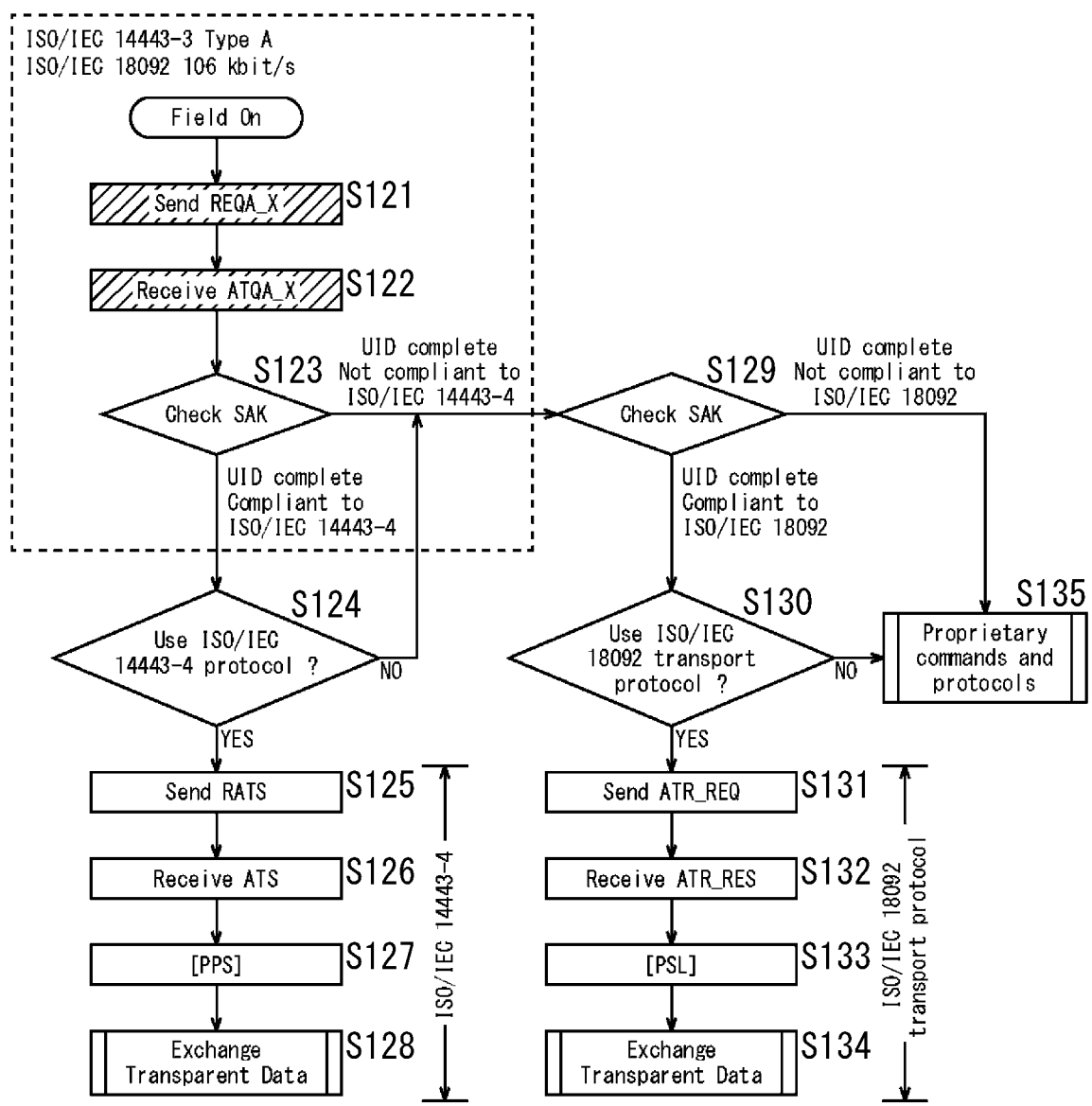
FIG. 26 is an explanatory flowchart illustrating an example when the extended polling commands REQA_X and ATQA_X are used according to the fifth embodiment (A4).

Next, the flowchart of FIG. 26 illustrates an example when the extended polling commands REQA_X and ATQA_X according to the fifth embodiment (A4) in FIG. 5 are used.

The IC card processing device 2 performs a polling process in steps S121 and S122 after field ON. That is, the IC card processing device 2 sends REQA_X in step S121. On the other hand, when the IC card 1 receives REQA_X, ATQA_X illustrated in FIG. 25 is sent.

In step S122, the IC card processing device 2 receives ATQA_X.

Note that since processes basically similar to those of steps S15 to S27 of FIG. 5 are performed in steps S123 to S135 of FIG. 24, the description thereof will be omitted.

As described above, when REQA_X is sent and ATQA_X is received, the selection of the application and the acquisition of UID are completed. Therefore, an anticollision process is unnecessary.

9. Initialization Process of Type B

The IC card (PICC) 1 and the IC card processing device (PCD) 2 of Type B of the standard ISO/IEC 14443 as of 2017 performs a stage of performing an anticollision process of designating an application family (AFI) and the number of slots (N), acquiring a unique identifier (UID) of one communication target IC card 1 among the plurality of IC cards 1, selecting the IC card 1, and then selecting an application hosted by the IC card 1, as a communication initialization process, and then performs a process of the application.

Figure 27:
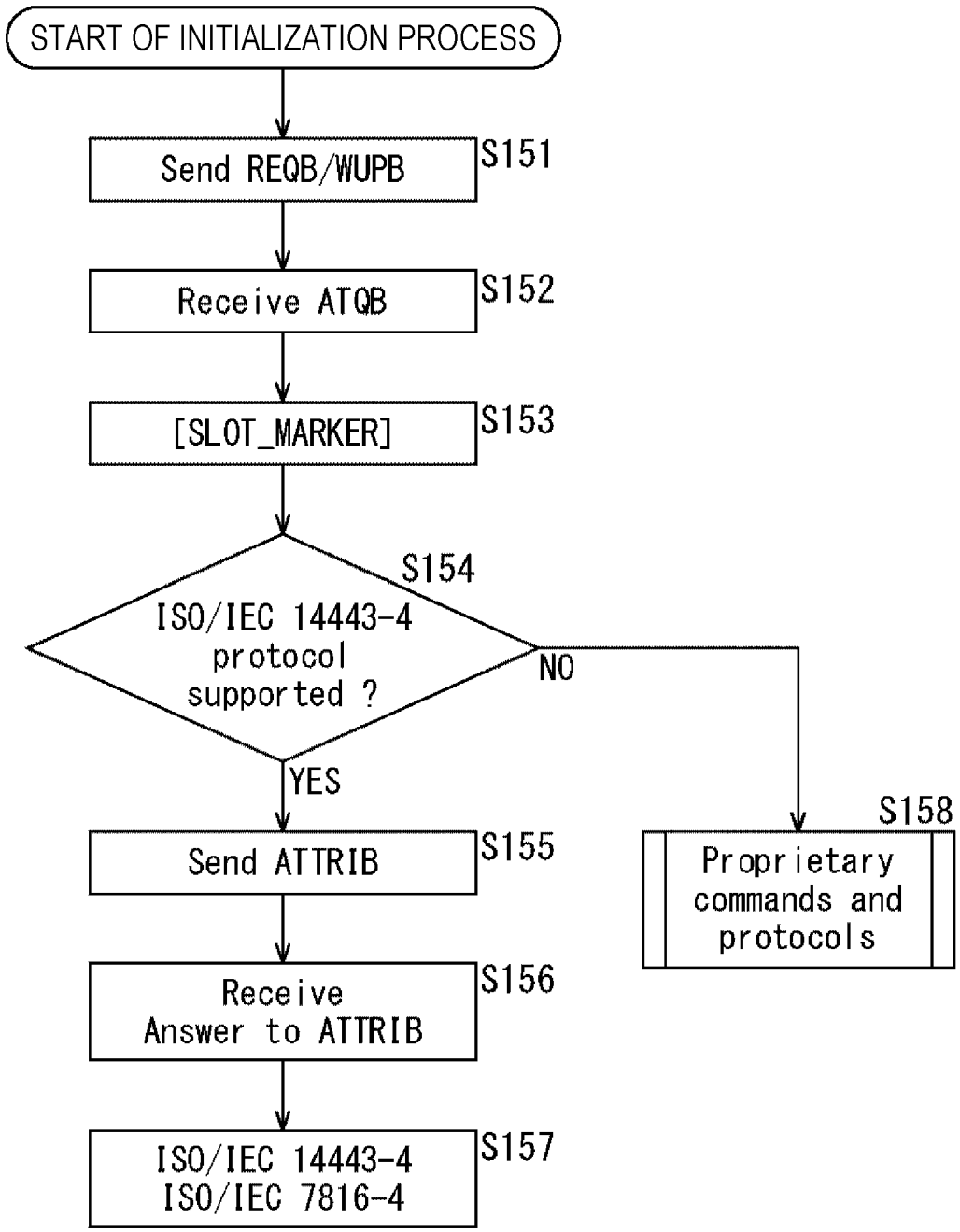
FIG. 27 is an explanatory flowchart illustrating an example of an initialization process of Type B.

The flowchart of FIG. 27 illustrates an example of an initialization process of Type B.

Figure 28:
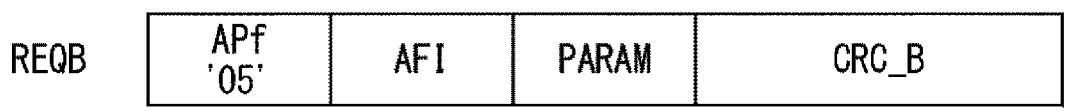
FIG. 28 is a diagram illustrating an exemplary configuration of REQB.

In steps S151 and S152, the IC card processing device 2 performs a polling process. That is, in step S151, the IC card processing device 2 sends REQB or WUPB illustrated in FIG. 28. In FIG. 28, REQB includes APF '05,' AFI, PARAM, and CRC_B. On the other hand, when the IC card 1 receives REQB and WUPB, ATQB is sent.

FIG. 29 is a diagram illustrating exemplary coding of AFI of REQB in FIG. 28. A of FIG. 30 illustrates exemplary coding of PARAM of REQB of FIG. 28. In PARAM, b8 to b6 are RFU, b5 is extended ATQB supported, b4 is REQB or WUPB, and b3 to b1 are N.

B of FIG. 30 illustrates exemplary coding of N in A of FIG. 30.

In step S152, the IC card processing device 2 receives ATQB. In step S153, the IC card processing device 2 performs an anticollision process with a SLOT_MAKER command.

FIG. 31 illustrates an exemplary configuration of a SLOT_MAKER command. The SLOT_MAKER command includes APn (1-byte length) and CRC_B (2-byte length).

FIG. 32 illustrates exemplary coding of APn of a SLOT_MAKER command in FIG. 31. APn includes a slot number formed by 4 bytes of b8 to b5 and [0101b] formed by 4 bytes of b4 to b1.

FIG. 33 is a diagram illustrating exemplary coding of the slot number in FIG. 32.

A of FIG. 34 illustrates an exemplary basic format of ATQB received in step S152 of FIG. 27. B of FIG. 34 illustrates an exemplary extended format of ATQB received in step S152 of FIG. 27.

Referring back to FIG. 27, after the anticollision process in step S153, the IC card processing device 2 determines in step S154 whether or not the protocol of ISO/IEC 14443-4 is supported. In a case where it is determined in step S154 that the protocol of ISO/IEC 14443-4 is supported, the process proceeds to step S155.

In step S155, the IC card processing device 2 sends ATTRIB. On the other hand, when the IC card 1 receives ATTRIB, a response to ATTRIB is sent. In step S156, the IC card processing device 2 receives the response to ATTRIB. In step S157, the IC card processing device 2 performs a process compliant with ISO/IEC 7816-4 as the selection of the application.

Conversely, in a case where it is determined in step S154 that the protocol of ISO/IEC 1444304 is not supported, the process proceeds to step S158. In step S158, a proprietary protocol is used in the selection of the application.

Figure 35:
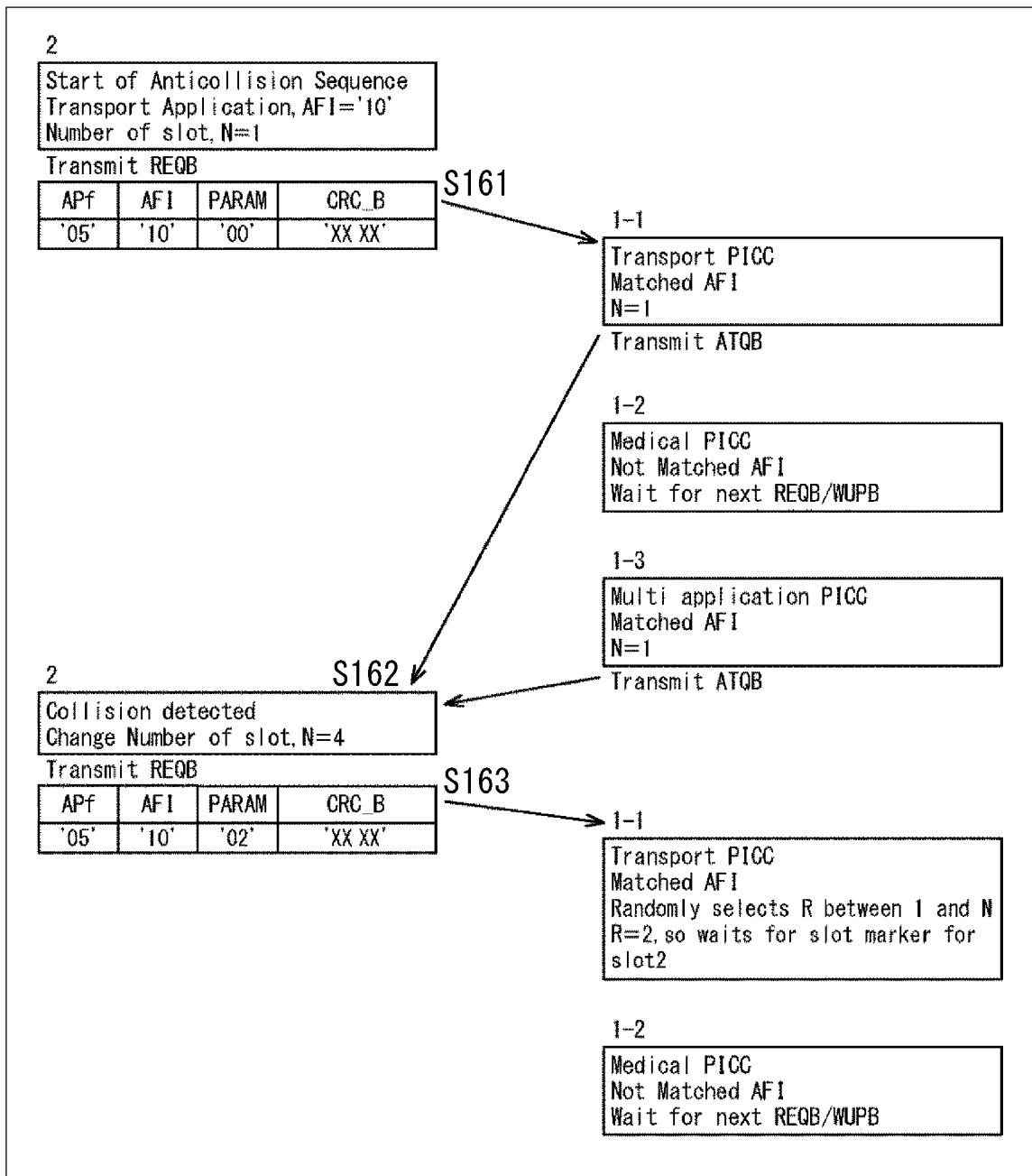
FIG. 35 is a diagram illustrating an example of anticollision in which an application family (AFI) and the number of slots (N) are designated.
Figures 36, 37:
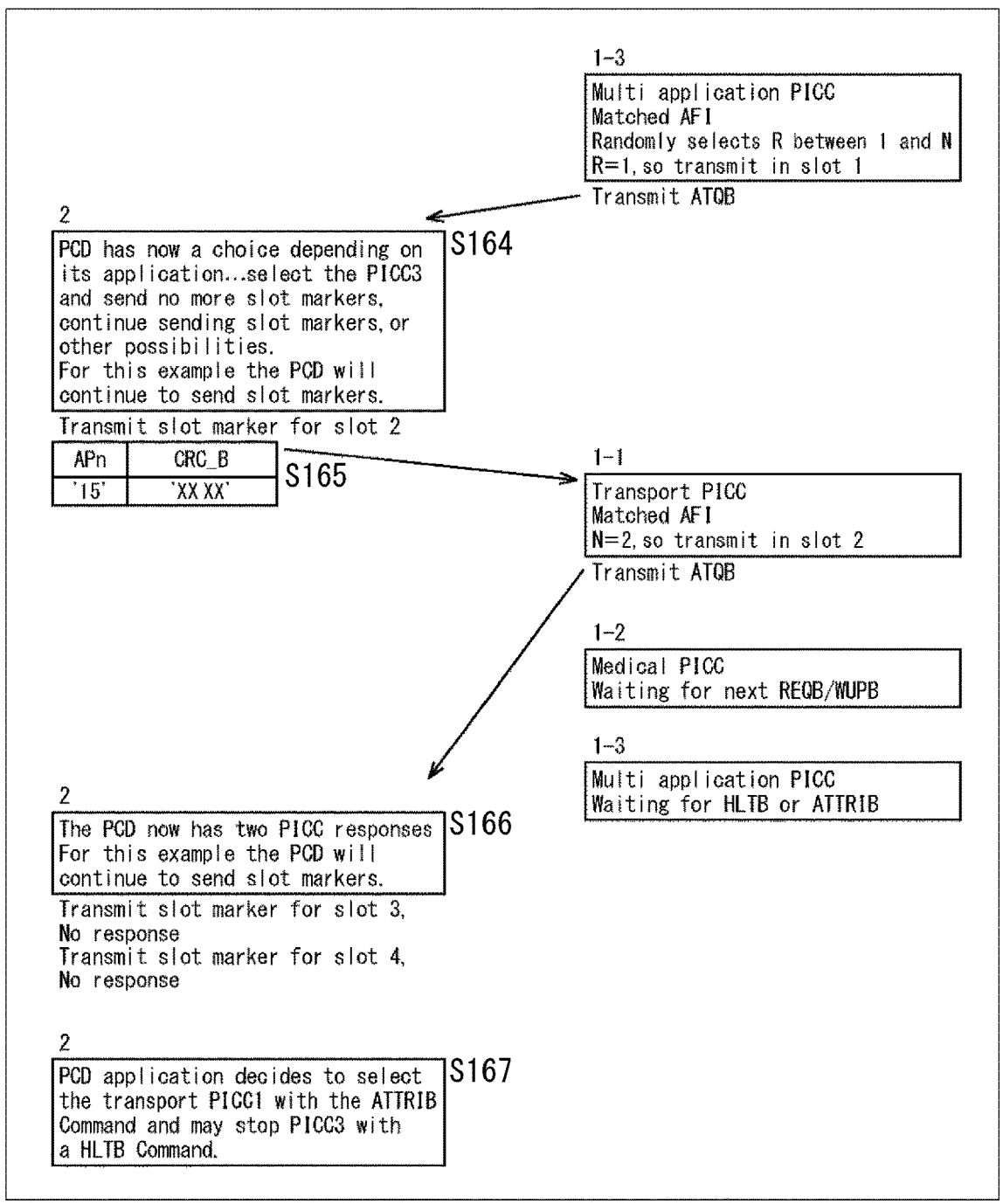
FIG. 36 is a diagram illustrating an example of anticollision in which an application family (AFI) and the number of slots (N) are designated.
FIG. 37 is a diagram illustrating exemplary coding of PARAM in which a timeslot bit is added.

FIGS. 35 and 36 are diagrams illustrating an example of an anticollision process in which an application family (AFI) and the number of slots (N) are designated.

10. Sixth Embodiment (B1)

In a sixth embodiment (B1) of the present technology, timeslots are introduced to the anticollision process of Type B.

That is, in Type B, realization of restriction of the replying IC card 1 is completed by designating a category (AFI) of an application field with REQB, but it is necessary to send a command for each slot in anticollision by a SLOT_MARKER command. Therefore, a probability that the IC card 1 may not correctly receive commands may increase and there is a possibility of the anticollision process failing.

Accordingly, in the present technology, timeslots are introduced as a method of decreasing the probability. PARAM of REQB is changed, as illustrated in FIG. 37.

FIG. 37 is a diagram illustrating exemplary coding of PARAM in which a timeslot bit is added.

That is, of b8 to b6 which are RFU, b7 is used for a timeslot. In a case where b7 (timeslot) is 1b, the IC card processing device 2 waits for ATQB in the number of timeslots encoded with N. The IC card 1 generates random numbers in a range of the number of timeslots and replies with the timeslots of the random numbers.

Start of a timeslot is set to 4096/fc (302 ms) after the end of a frame (EOF) of REQB and
a time of each timeslot is set to:

SOF max+(ATQB length+1) byte transmission time (including EGT)+EOF max+*TR*1 max=14 etu+ [16 bytes×(10+2)×1 etu]+11 etu+25 etu=242 etu (2.28 ms).

Figure 38:
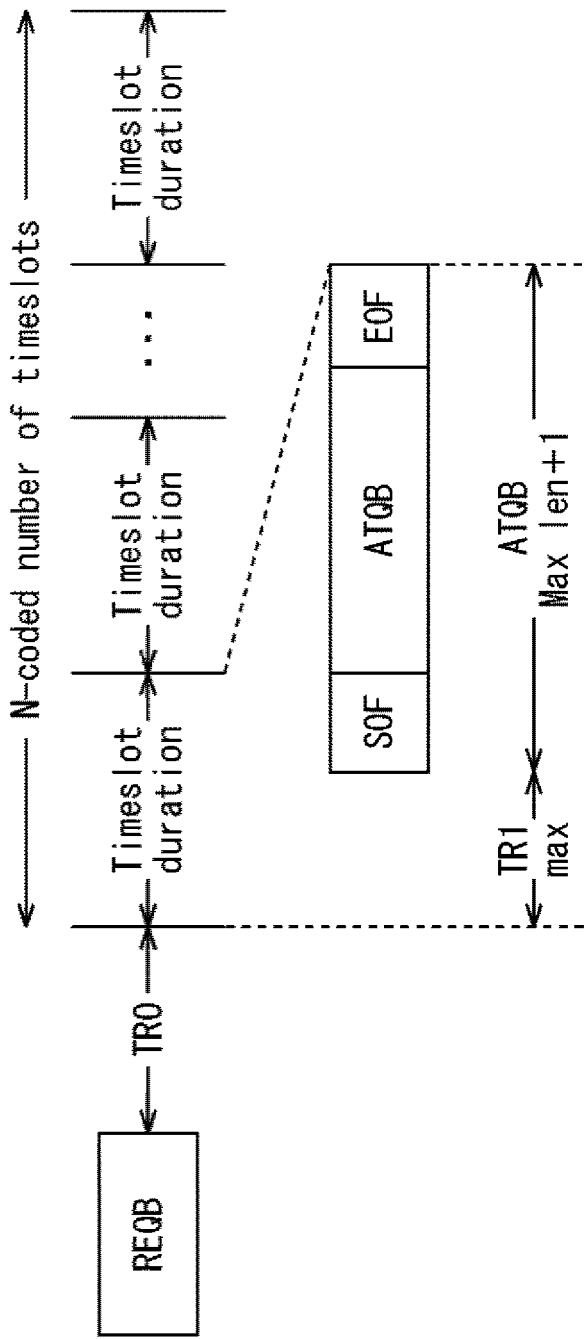
FIG. 38 is a diagram illustrating an example of a timing of a timeslot.
Figure 39:
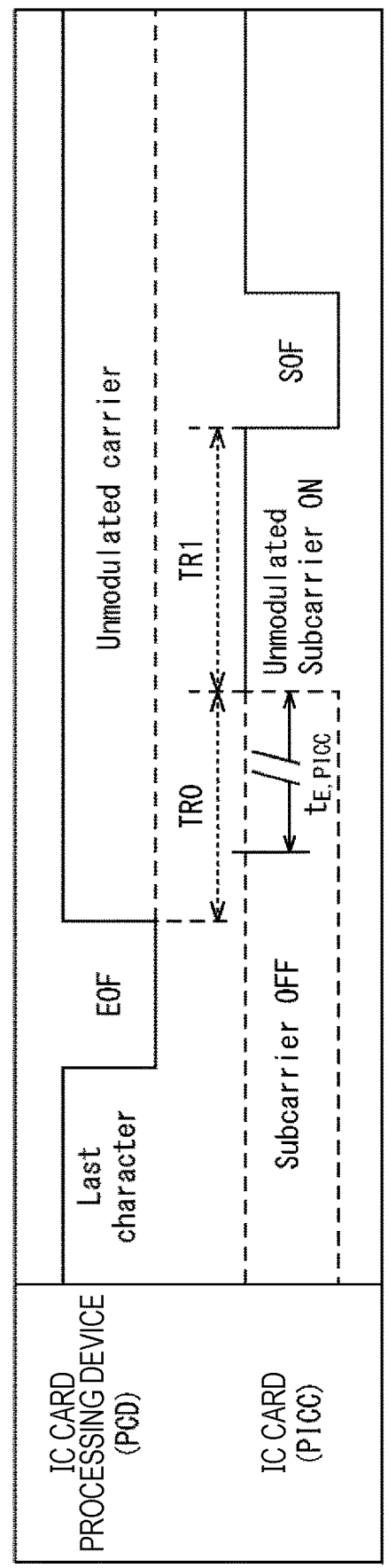
FIG. 39 is a diagram illustrating an example of a timing of Type B before SOF of an IC card.

FIG. 38 is a diagram illustrating an example of a timing of a timeslot. FIG. 39 is a diagram illustrating an example of a timing of Type B before SOF of an IC card.

In FIGS. 38 and 39, TR1 is an unmodulated subcarrier time.

11. Seventh Embodiment (B2)

In a seventh embodiment (B2) of the present technology, AFI of Type B is extended so that 2 bytes can be additionally designated.

That is, in Type B, AFI can be designated with REQB, but since there is only an 8-bit field, scalability lacks.

Accordingly, to extend AFI, PARAM of REQB is extended, as illustrated in FIG. 40. That is, of b8 to b6 which are RFU, b7 is changed to a timeslot and b6 is changed to Extended AFI supported. Additionally, in a case where Extended AFI supported of b6 is 1b, definition is given as illustrated in FIG. 41.

Figure 41:
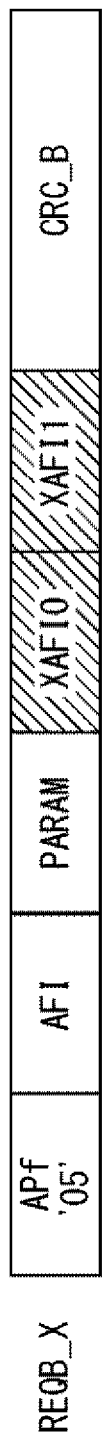
FIG. 41 is a diagram illustrating an exemplary configuration of REQB_X.

That is, in REQB_X of FIG. 41, XAFI0 and XAFI1 are added between PARAM and CRC_B of REQB in FIG. 28. In a case where an application is selected with the SC (2 bytes), the SC is expressed with AFI and XAFI0 and XAFI1 is considered as an additional parameter. In this case, the IC card 1 evaluates XAFI0 and XAFI1 in addition to AFI and determines whether or not to reply.

In addition, as another example, as in the fourth embodiment (A3), definition is given as in FIG. 42 in a case where length information regarding the additional parameter is stored.

In REQB_X in FIG. 42, XAFI_L, XAFI0, . . . , and XAFIn are added between PARAM and CRC_B of REQB in FIG. 28.

The IC card 1 recognizes which application identification information in 1. to 3 shown in the fourth embodiment (A3) is designated using a value of XAFI_L, compares the application identification information with application information in the IC card 1, and replies with ATQB_X when the information matches each other.

Here, in the case where the NFC device 51 that has the configuration described above in FIG. 14 is used as the IC card 1, parameters returned in the anticollision process of Type B are defined as Listen B Parameters of NCI and card RF gate for RF technology Type B registries of ETSI TS 102 622.

As Listen B Parameters, LB_SC (2-byte length or n × 2-byte length) and LB_AID (16-byte length) are added. As card RF gate for RF technology Type B registries, the SC (2-byte length or n × 2-byte length) and LB_AID (16-byte length) are added.

When REQB_X is received, NFCC evaluates these parameters, and if the parameters are matched, a response is returned.

12. Eighth Embodiment (B3)

In an eighth embodiment (B3) of the present technology, in a beginning of an initialization process of Type B, card presence or absence is detected (through a polling process). Thus, it is possible to reduce power consumption in the card presence or absence.

Figure 43:
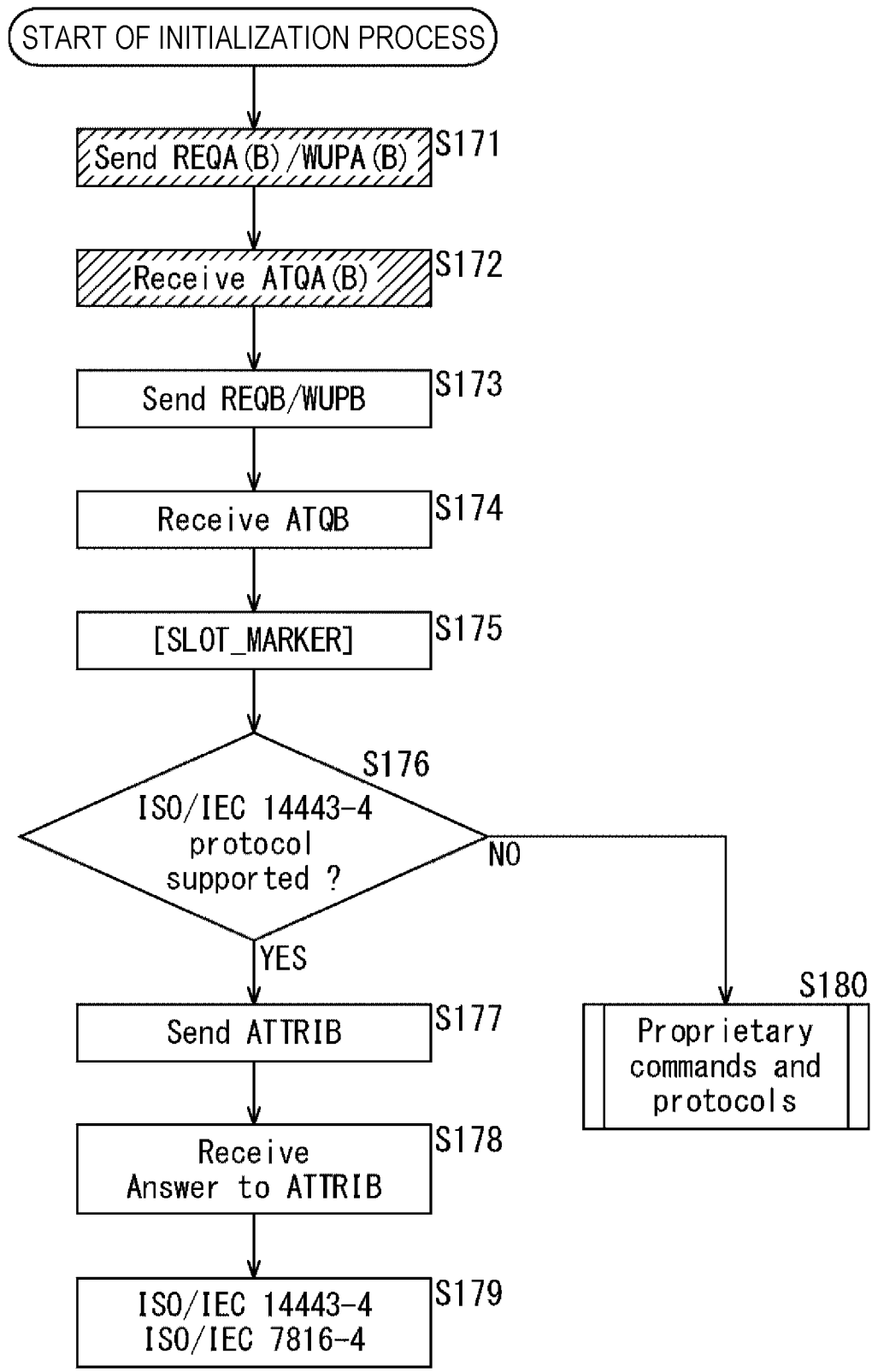
FIG. 43 is an explanatory flowchart illustrating an example of an initialization process according to an eighth embodiment (B3) of the present technology.

The flowchart of FIG. 43 illustrates an example of an initialization process according to the eighth embodiment (B3) of the present technology. Note that processes basically similar to those of steps S153 to S158 of FIG. 27 are performed in steps S175 to S180 of FIG. 43, the repeated description will be omitted.

That is, the IC card processing device 2 performs a polling process in steps S171 to S174. That is, the IC card processing device 2 sends REQA (B) or WUQA (B) in step S171. On the other hand, since the IC card 1 receives REQA (B) or WUQA (B), ATQA (B) is returned. Therefore, the IC card processing device 2 receives ATQA (B) in step S172. Further, the IC card processing device 2 sends REQB in step S173. On the other hand, when the IC card 1 receives REQB, ATQB is returned. Therefore, the IC card processing device 2 sends ATQB in step S174.

Figure 44:
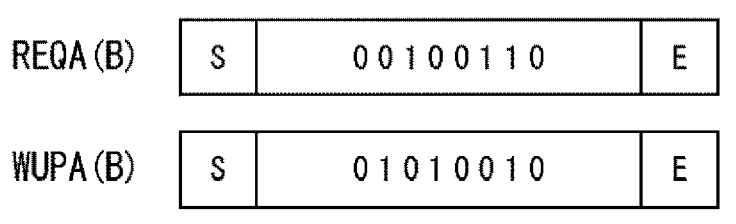

FIG. 44 is a diagram illustrating examples of REQA (B) and WUPA (B) sent and received in steps S171 and S172. FIG. 45 is a diagram illustrating an example of ATQA (B) sent and received in steps S173 and S174. Note that a modulation scheme and bit encoding of Type B are used.

13. Timeslot Initialization Process of Type A

The IC card (PICC) 1 and the IC card processing device (PCD) 2 of Type A (a timeslot scheme) performs a stage of performing an anticollision process using timeslots, acquiring a unique identifier (UID) of one communication target IC card 1 among the plurality of IC cards 1, selecting the IC card 1, and then selecting an application hosted by the IC card 1, as a communication initialization process, and then performs a process of the application.

Figure 46:
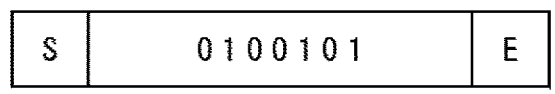
FIG. 46 is a diagram illustrating an example of a command format (short frame) of REQA.
Figure 47:
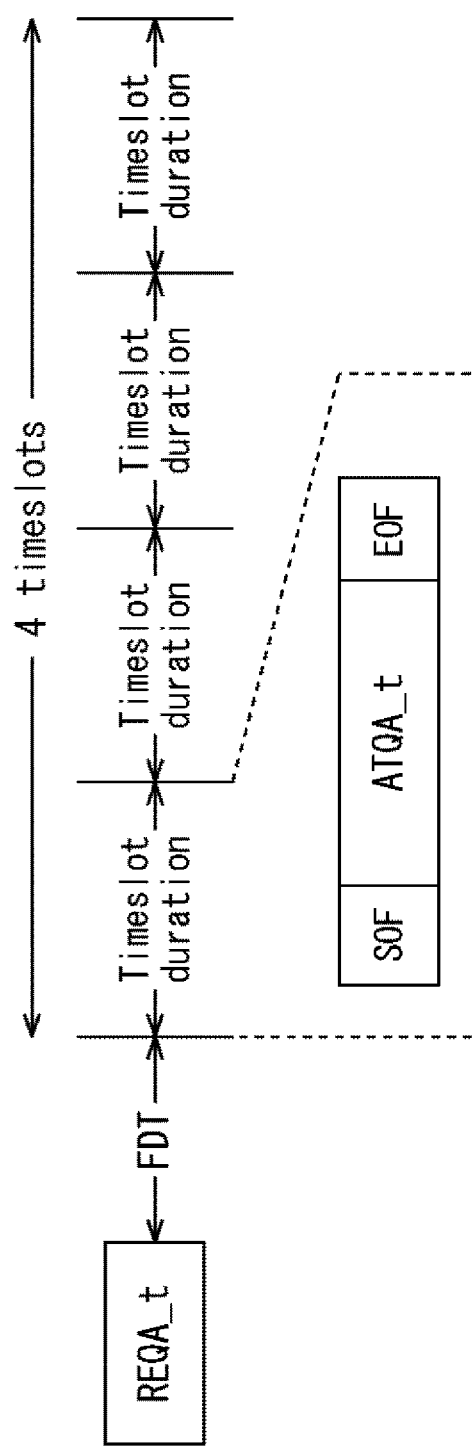
FIG. 47 is a diagram illustrating an example of a timing in Type A (a timeslot scheme).

FIG. 46 is a diagram illustrating an example of a command format (short frame) of REQA. FIG. 47 is a diagram illustrating an example of a timing in Type A (the timeslot scheme). FIG. 48 is a diagram illustrating an example of a set of a command and a response in Type A (the timeslot scheme). FIG. 49 is a diagram illustrating an example of a parameter of an REQ-ID command in Type A (the timeslot scheme).

Figure 50:
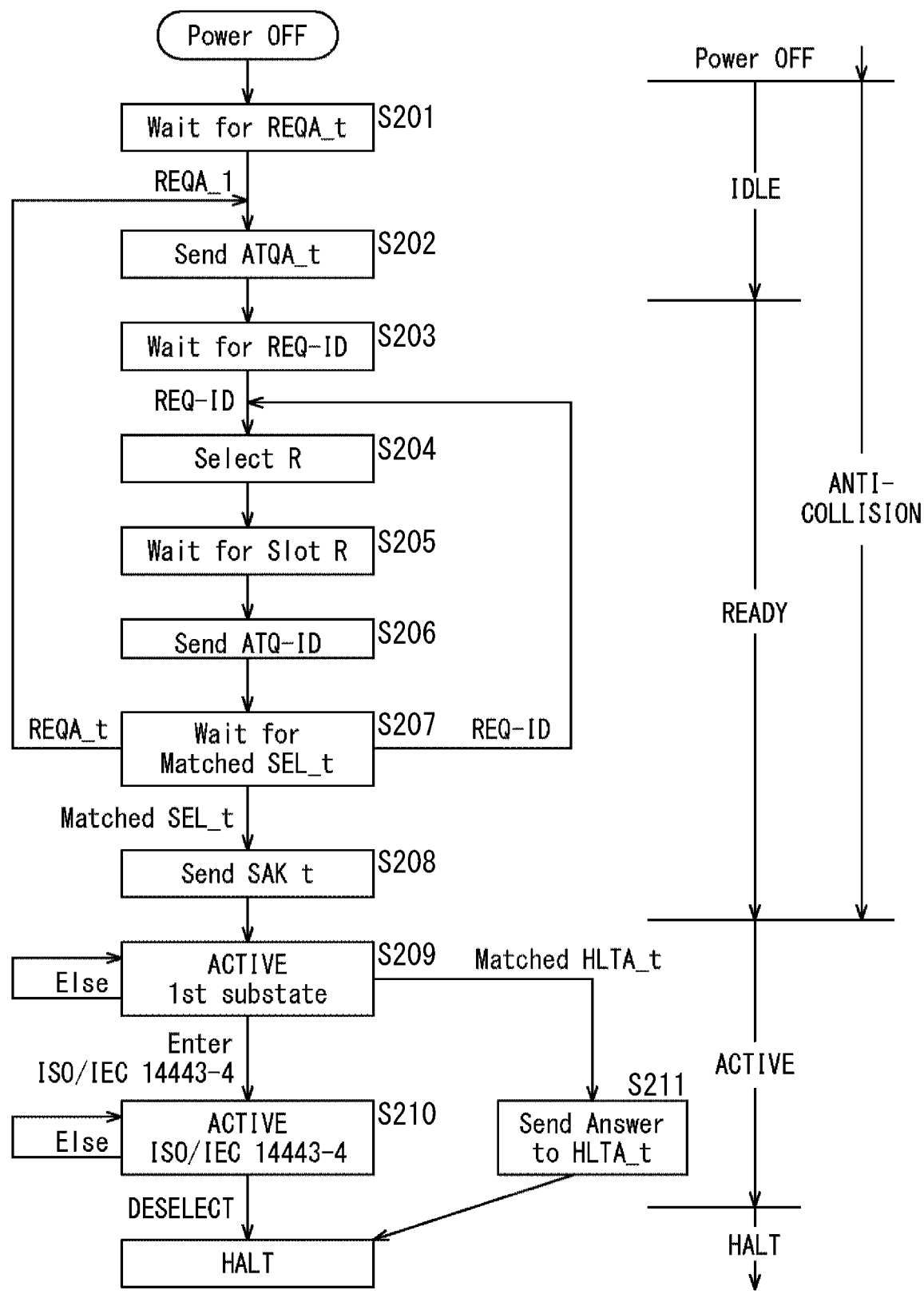
FIG. 50 is an explanatory flowchart illustrating an example of a process of Type A (the timeslot scheme).

FIG. 50 is an explanatory flowchart illustrating an example of a process of Type A (the timeslot scheme).

14. Ninth Embodiment (A5)

In a ninth embodiment (A5) of the present technology, an REQ-ID command is extended using Type A (the timeslot scheme) as a base, the extended REQ-ID command is referred to as REQ-ID_X, 2-byte application identification information (SC0 and SC1) is added, and only the IC card 1 having the application identification information can reply.

Figure 51:
FIG. 51 is a diagram illustrating an example of a command format of REQ-ID_X.

FIG. 51 is a diagram illustrating an example of a command format of REQ-ID_X. REQ-ID_X includes REQ-ID, P1, P2, SC0, SC1, and CRC_B.

Whether or not to include the application identification information is indicated b1 of P2. A response to REQ-ID_X is referred to as ATQ-ID.

FIG. 52 is a diagram illustrating exemplary coding of P2. In FIG. 52, b8 to b2 are 0. If b1 is 0, compliance with an REQ-ID format is indicated. If b1 is 1, compliance with an REQ-ID_X format is indicated.

15. Initialization Process for ISO/IEC 18092 212 Kbit/s+JIS X 6319-4 Extension In the standard ISO/IEC 18092 212 kbit/s as of 2017, information regarding an application is not supplemented in an anticollision process, but this part is extended by JIS X 6319-4.

Figure 53:
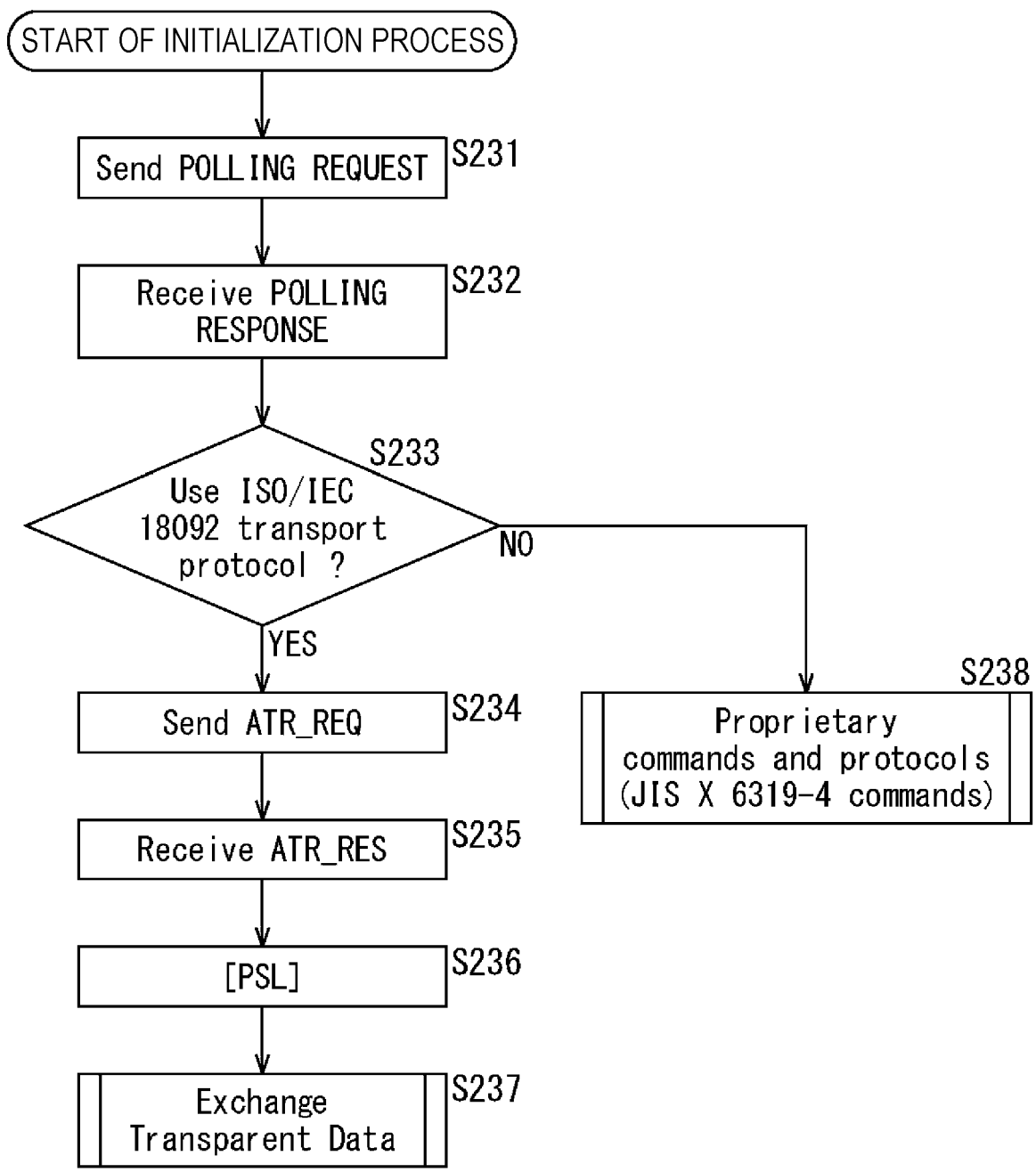
FIG. 53 is an explanatory flowchart illustrating an extended initialization process.

FIG. 53 is an explanatory flowchart illustrating an extended initialization process. In the initialization process of FIG. 53, an application family called a system code (SC) is designated, the anticollision process (POLLING REQUEST and POLLING RESPONSE) are performed using timeslots in steps S231 and S232, NFCID2 (unique identifier) of one communication target IC card 1 in the plurality of IC cards 1 is acquired.

In step S233, it is determined whether or not the transport protocol of ISO/IEC 18092 is not used. In a case where the transport protocol of ISO/IEC 18092 is used, the IC card processing device 2 sends ATR_REQ in step S235 and receives ATS_RES in step S236. In step S237, a process for a PSL command is performed. In step S238, transparent data is exchanged.

In a case where the transport protocol of ISO/IEC 18092 is not used in step S233, the process proceeds to step S239 and a process of the application in the JIS X 6319-4 base is performed. Note that in ISO/IEC 18092, a command sending side is referred to as an initiator and a response sending side is referred to as a target. Here, the command sending side is referred to as the IC card processing device 2 and the response sending side is referred to as the IC card 1 in consideration of comparison with another standard.

FIG. 54 is a diagram illustrating an exemplary configuration of POLLING REQUEST of a JIS X 6319-4 extension. FIG. 55 is a diagram illustrating an exemplary configuration of POLLING RESPONSE of a JIS X 6319-4 extension.

16. Tenth Embodiment (J1)

In a tenth embodiment (J1) of the present technology, card presence or absence is detected by REQA-F/ATQA-F in a beginning of an initialization process of ISO/IEC 18092 212 kbit/s. Thus, it is possible to reduce power consumption in the card presence or absence.

Figure 56:
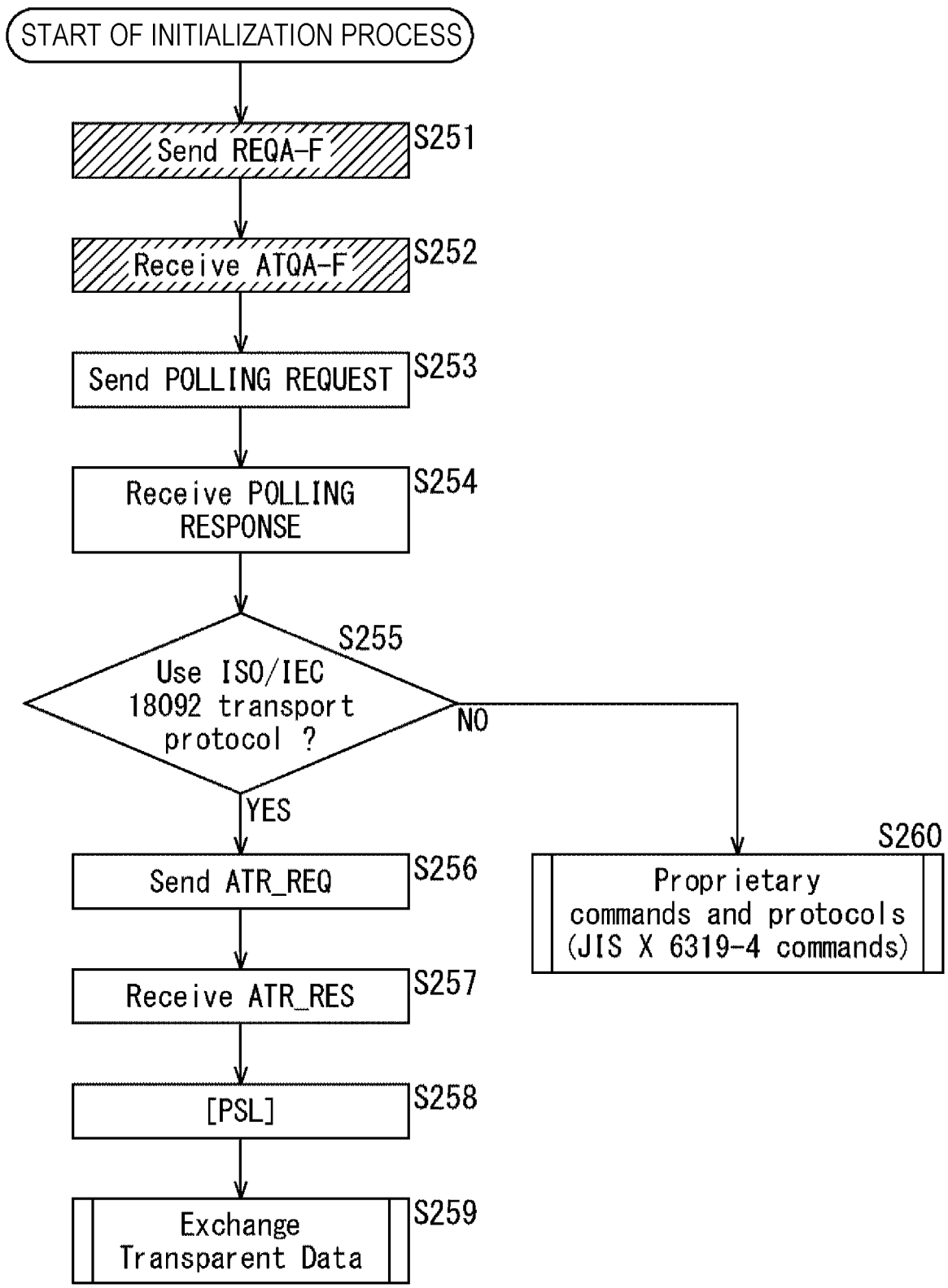
FIG. 56 is an explanatory flowchart illustrating an example of an initialization process according to a ninth embodiment of the present technology.

The flowchart of FIG. 56 illustrates an example of an initialization process according to the tenth embodiment of the present technology. Note that processes basically similar to those of steps S231 to S238 of FIG. 53 are performed in steps S253 to S260 of FIG. 56, the repeated description will be omitted.

That is, when the IC card processing device 2 sends REQA-F and the IC card 1 receives REQA-F in a polling process of steps S251 and S252, ATQA-F is sent. Therefore, the IC card processing device 2 receives ATQA-F.

Figure 57:
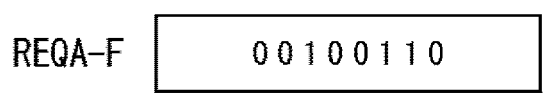
Figure 58:
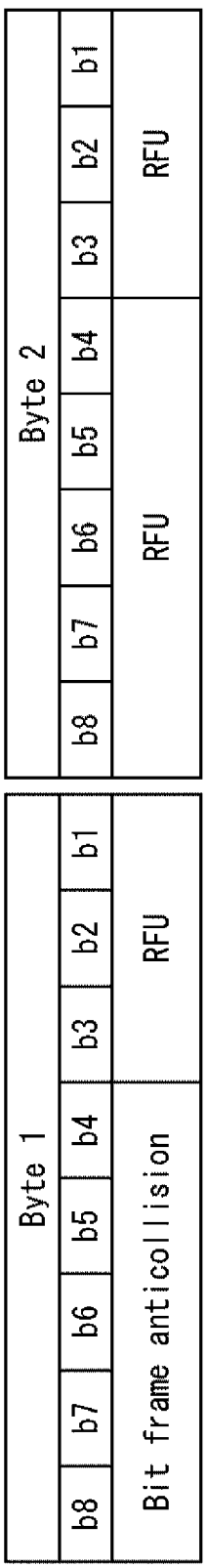
FIG. 58 is a diagram illustrating an example of the format of ATQA-F.

FIG. 57 is a diagram illustrating an example of the format of REQA-F. FIG. 58 is a diagram illustrating an example of the format of ATQA-F. Note that a modulation scheme and bit encoding of ISO/IEC 18092 212 kbit/s are used.

17. Eleventh Embodiment (J2)

An eleventh embodiment (J2) of the present technology is a modification of the tenth embodiment (J1) of the present technology. In communication initialization, anticollision is not performed, that is, a response (an anticollision process using bit collision) is instructed with a single timeslot without designating timeslots. A case in which the IC card processing device 2 performs reception by dividing the plurality of IC cards 1 to separate timeslots is not assumed, a standby time of responses can be shortened by transmitting POLLING REQUEST without designating the timeslots. As a result, it is possible to shorten an entire transaction time.

Note that 0 is designated in a timeslot number of POLLING REQUEST in FIG. 54.

18. Process Sequence Comparison

FIGS. 59 and 60 are diagrams illustrating differences in a process up to file access in accordance with a combination of communication initialization and a file system.

The communication initialization illustrated in FIG. 59 is as follows.

1. Regulations are given by ISO/IEC 14443 Type A (ISO/IEC 18092 106 kbit/s). The detection of card presence or absence, card recognition (UID acquisition), and protocol activation are each performed in sequence. The card recognition means that the PCD (the IC card processing device 2) individually recognizes the PICC (the IC card 1) by UID or the like included in a response when the PICC (the IC card 1) replies.

2. Regulations are given by ISO/IEC 14443 Type B. After an application family is selected, the card recognition and the protocol activation are each performed in sequence. The sixth embodiment (Example B1) (application of timeslots to Type B) is included therein.

3. The first embodiment (Example A1) and the second embodiment (Example A2) based on Type A. After the detection of the card presence or absence, selection of an application family (2-byte system code) and the card recognition (8-byte IDm) are performed using anticollision of CL1 to CL3.

4. The fourth embodiment (Example A3) based on Type A. The detection of the card presence or absence is not performed and the card recognition is performed after an application family or an application is selected.

5. The fifth embodiment (Example A4) based on Type A. The detection of the card presence or absence and anticollision are not performed and an application family or an application is selected.

6. The seventh embodiment (Example B2) based on Type B. AFI is extended and not only an application family but also an application can be selected.

7. The eighth embodiment (Example B3) based on Type B. In a beginning of initialization, REQA/ATQA of Type A (Type B is used in modulation and bit encoding) is introduced to realize polling at a high speed and with low power consumption.

8. Extension of ISO/IEC 18092 212 kbit/s by JIS X 6319-4. Anticollision in which an application family can be selected and timeslots are used is performed.

9. The tenth embodiment (Example J1) based on 18092. REQA/ATQA of Type A (ISO/IEC 18092 212 kbit/s is used in modulation and bit encoding) is introduced to realize polling at a high speed and with low power consumption.

10. The eleventh embodiment (Example J2) based on 18092. As in Example J1, REQA/ATQA of Type A is introduced to realize polling at a higher speed and with low power consumption in which anticollision is omitted.

A file system illustrated in FIG. 60 is as follows.

F.1. Regulations are given by ISO/IEC 7816-4. For a selected card, after a file such as DF or EF is selected with a SELECT command, access to a file selected with a READ BINARY command or the like is performed.

F.2. Regulations are given by JIS X6319-4. Access to a designated file in a designated card is performed with a Read command including an identifier of a card and identifiers such as an area code and a service code (identification of an application or a file).

As described above, according to the present technology, by completing the selection of an application by the IC card processing device (PCD) in an early stage until completion of the anticollision process, it is possible to quickly start the process of the application with the IC card (PICC), which contributes to a reduction in an entire RF transaction time.

By selecting an application before the anticollision process and contributing to a reduction in the IC cards (PICC) replying in the anticollision, contribution to a reduction in processes of the IC card processing device (PCD) is also made.

Now, there is a public transportation system (for example, Suica) as one of the application fields of short-range wireless communication systems such as FeliCa (registered trademark) by Sony Corporation which is the present applicant. From the fact that an acceleration process in which a card processing time is 200 ms or less at an automatic ticket gate is requested, the acceleration also contributes to achievement in process performance requested in a public transportation system even in a short-range wireless communication system using Type A in which a communication speed of RF is 106 kbps (for example, a communication speed of RF is 212 kbps of FeliCa (registered trademark)).

19. Configuration Example of Computer

The series of processes described above can be executed by hardware, and can also be executed in software. In the case of executing the series of processes by software, a program forming the software is installed on a computer. Herein, the term computer includes a computer built into special-purpose hardware, a computer able to execute various functions by installing various programs thereon, such as a general-purpose personal computer, for example, and the like.

Figure 61:
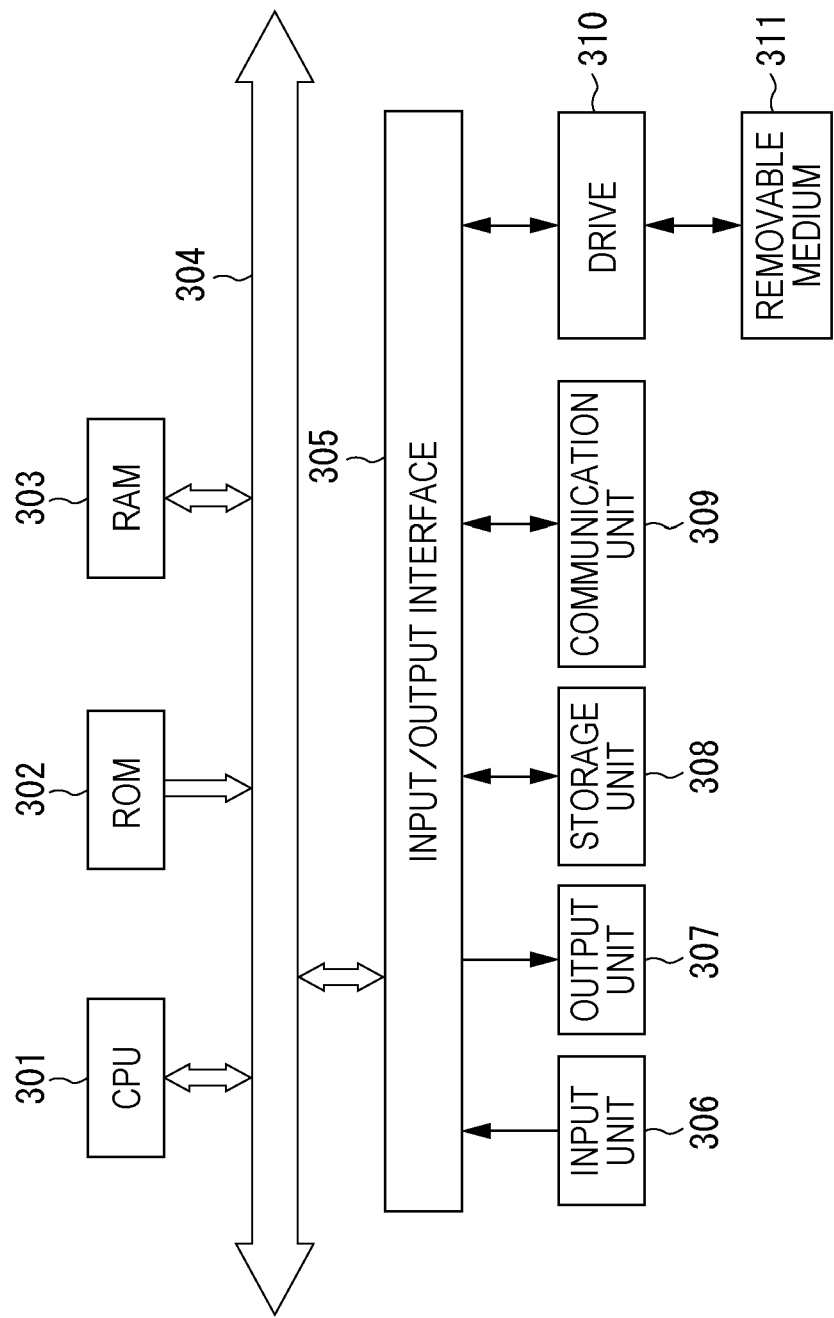
FIG. 61 is a block diagram illustrating an exemplary hardware configuration of a computer.

FIG. 61 is a block diagram illustrating an exemplary hardware configuration of a computer that executes the series of processes described above according to a program. For example, the control device 21 illustrated in FIG. 1 includes the computer illustrated in FIG. 61.

In the computer illustrated in FIG. 61, a central processing unit (CPU) 301, read-only memory (ROM) 302, and random access memory (RAM) 303 are interconnected through a bus 304.

Additionally, an input/output interface 305 is also connected to the bus 304. An input unit 306, an output unit 307, a storage unit 308, a communication unit 309, and a drive 310 are connected to the input/output interface 305.

The input unit 306 includes a keyboard, a mouse, a microphone, a touch panel, an input terminal, and the like, for example. The output unit 307 includes a display, a speaker, an output terminal, and the like, for example. The storage unit 308 includes a hard disk, a RAM disk, non-volatile memory, and the like, for example. The communication unit 309 includes a network interface, for example. The drive 310 drives a removable medium 311 such as a magnetic disk, an optical disc, a magneto-optical disc, or semiconductor memory.

In addition, in an IC card 1 configured as illustrated in FIG. 1, the series of processes described above are performed by having the CPU 10 load a program stored in the data memory 13 into the working memory 12 via the CPU 10, and execute the program, for example. Additionally, data required for the CPU 10 to execute various processes and the like is also stored in the working memory 12 as appropriate.

The program executed by the computer (CPU 10) may be applied by being recorded onto the removable medium (now shown) as an instance of packaged media or the like, for example. In this case, the program may be installed in the data memory 13 via the CPU 10 by inserting the removable medium into the drive.

In addition, the program may also be provided via a wired or wireless transmission medium such as a local area network, the Internet, or digital satellite broadcasting. In this case, the program may be received by the interface 17 and installed in the data memory 13.

Otherwise, the program may also be preinstalled in the working memory 12 or the data memory 13.

In a computer configured as above, the series of processes described above are performed by having the CPU 10 load a program stored in the data memory 13 into the working memory 12, and execute the program, for example. Additionally, data required for the CPU 10 to execute various processes and the like is also stored in the working memory 12 as appropriate.

The program executed by the computer (CPU 10) may be applied by being recorded onto the removable medium as an instance of packaged media or the like, for example. In this case, the program may be installed in the working memory 12 via the CPU 10 by inserting the removable medium into the drive.

In addition, the program may also be provided via a wired or wireless transmission medium such as a local area network, the Internet, or digital satellite broadcasting. In this case, the program may be received by the interface 17 and installed in the working memory 12.

Otherwise, the program may also be preinstalled in the program memory 11 or the working memory 12.

In addition, an embodiment of the present technology is not limited to the embodiments described above, and various changes and modifications may be made without departing from the scope of the present technology.

For example, in this specification, a system means a set of a plurality of constituent elements (e.g., devices or modules (parts)), regardless of whether or not all the constituent elements are in the same housing. Accordingly, a plurality of devices that is contained in different housings and connected via a network and one device in which a plurality of modules is contained in one housing are both systems.

Further, for example, an element described as a single device (or processing unit) may be divided and configured as a plurality of devices (or processing units). Conversely, elements described as a plurality of devices (or processing units) above may be configured collectively as a single device (or processing unit). Further, an element other than those described above may be added to the configuration of each device (or processing unit). Furthermore, a part of the configuration of a given device (or processing unit) may be included in the configuration of another device (or another processing unit) as long as the configuration or operation of the system as a whole is substantially the same.

In addition, for example, the present technology can adopt a configuration of cloud computing which performs processing by allocating and sharing one function by a plurality of devices through a network.

In addition, for example, the program described above can be executed in any device. In this case, it is sufficient if the device has a necessary function (functional block or the like) and can obtain necessary information.

In addition, for example, each step described by the above-described flowcharts can be executed by one device or executed by being allocated to a plurality of devices. Furthermore, in the case where a plurality of processes is included in one step, the plurality of processes included in this one step can be executed by one device or executed by being allocated to a plurality of devices.

Note that in a program executed by a computer, processing in steps describing the program may be executed chronologically along the order described in this specification, or may be executed concurrently, or individually at necessary timing such as when a call is made. Furthermore, processing in steps describing the program may be executed concurrently with processing of another program, or may be executed in combination with processing of another program.

Note that the plurality of present technologies described in this specification can be performed alone independently of each other, unless a contradiction arises. Of course, any plurality of the present technologies can be performed in combination. In one example, the present technology described in any of the embodiments can be performed in combination with the present technology described in another embodiment. In addition, any of the present technologies described above can be performed in combination with another technology that is not described above.

Additionally, the present technology may also be configured as below.

(1) A communication device including:

an application selection unit configured to select an application hosted by a communication target device; and an identification information acquisition unit configured to acquire identification information of the communication target device after the application selection unit selects the application.

(2) The communication device according to (1), in which the application selection unit selects the application hosted by the communication target device by including application identification information in a command to be first transmitted in an anticollision process, and the identification information acquisition unit acquires the identification information of the communication target device by performing the anticollision process.

(3) The communication device according to (2), in which the application identification information has 2 bytes.

(4) The communication device according to (3), in which the anticollision process is performed using a timeslot.

(5) The communication device according to (2), in which an SEL value of a first command in the anticollision process is set to a predetermined value.

(6) The communication device according to (2), further including:

a device detection unit configured to designate the application identification information and detect whether or not there is a communication target device in a beginning of an initialization process before the anticollision process of designating a timeslot.

(7) The communication device according to (5), further including:

a device detection unit configured to designate the application identification information and detect whether or not there is a communication target device in a beginning of an initialization process before the anticollision process in which bit collision is used.

(8) The communication device according to (1), in which the application selection unit selects the application hosted by the communication target device using an extended polling command in which a standard frame is used.

(9) The communication device according to (8), in which the extended polling command stores the application identification information and a length of the application identification information.

(10) The communication device according to (8) or (9), in which the extended polling command includes a command classified for each kind of application identification information.

(11) The communication device according to any one of (8) to (10), in which a response command sent by the communication target device receiving the extended polling command includes at least one of the identification information or protocol information of the communication target device.

(12) The communication device according to (1), in which the application selection unit introduces timeslots and performs an anticollision process of designating application identification information and the number of slots as a communication initialization process.

(13) The communication device according to (1), in which the application selection unit performs an anticollision process of designating application identification information and the number of slots as a communication initialization process, and the application identification information is additionally designatable in 2 bytes.

(14) The communication device according to (1), in which the application selection unit detects whether or not there is a communication target device through a polling process in a beginning of a communication initialization process and performs an anticollision process of designating application identification information and the number of slots as the communication initialization process.

(15) The communication device according to any one of (1) to (14), in which the communication target device is a near field communication (NFC) device.

(16) A communication method including:

by a communication device, selecting an application hosted by a communication target device; and acquiring identification information of the communication target device after the application is selected.

REFERENCE SIGNS LIST

1 IC card
2 IC card processing device
10 CPU
11 Program memory
12 Working memory
12a Logical channel management table
12b History management table
13 Data memory
15 Communication control unit
16 Power unit
17 Interface
51 NFC device
71 DH
72 NFCC
73 NFCEE
74 Antenna

The invention claimed is:

1. A communication device comprising:
an application selection unit configured to select an application hosted by a communication target device; and
an identification information acquisition unit configured to acquire identification information of the communication target device after the application selection unit selects the application,
wherein the application selection unit selects the application hosted by the communication target device using an extended polling command in which a standard frame is used, and
wherein the application selection unit and the identification information acquisition unit are each implemented via at least one processor.

2. The communication device according to claim 1,
wherein the application selection unit selects the application hosted by the communication target device by including application identification information in a command to be first transmitted in an anticollision process, and
the identification information acquisition unit acquires the identification information of the communication target device by performing the anticollision process.

3. The communication device according to claim 2,
wherein the application identification information has 2 bytes.

4. The communication device according to claim 3,
wherein the anticollision process is performed using a timeslot.

5. The communication device according to claim 2,
wherein a reserved for future use (RFU) value of a first command in the anticollision process is set to a predetermined value.

6. The communication device according to claim 2, further comprising:
a device detection unit configured to designate the application identification information and detect whether or not there is a communication target device in a beginning of an initialization process before the anticollision process of designating a timeslot,
wherein the device detection unit is implemented via at least one processor.

7. The communication device according to claim 2, further comprising:
a device detection unit configured to designate the application identification information and detect whether or not there is a communication target device in a beginning of an initialization process before the anticollision process in which bit collision is used,
wherein the device detection unit is implemented via at least one processor.

8. The communication device according to claim 1,
wherein the application selection unit selects the application hosted by the communication target device by including application identification information in a command to be first transmitted in an anticollision process, and
the extended polling command stores the application identification information and a length of the application identification information.

9. The communication device according to claim 1,
wherein the extended polling command includes a command classified for each kind of application identification information.

10. The communication device according to claim 1,
wherein a response command sent by the communication target device receiving the extended polling command includes at least one of the identification information and protocol information of the communication target device.

11. The communication device according to claim 1,
wherein the application selection unit introduces timeslots and performs an anticollision process of designating application identification information and a number of slots as a communication initialization process.

12. The communication device according to claim 1,
wherein the application selection unit performs an anticollision process of designating application identification information and a number of slots as a communication initialization process, and
the application identification information is additionally designatable in 2 bytes.

13. The communication device according to claim 1,
wherein the application selection unit detects whether or not there is a communication target device through a polling process in a beginning of a communication initialization process and performs an anticollision process of designating application identification information and a number of slots as the communication initialization process.

14. The communication device according to claim 1,
wherein the communication target device is a near field communication (NFC) device.

15. A communication method comprising:
selecting, by a communication device, an application hosted by a communication target device; and
acquiring, by the communication device and from the communication target device, identification information of the communication target device after the application is selected,
wherein the application hosted by the communication target device is selected using an extended polling command in which a standard frame is used.

16. A non-transitory computer-readable medium having embodied thereon a program, which when executed by a computer causes the computer to execute a method, the method comprising:
selecting, by a communication device, an application hosted by a communication target device; and
acquiring, by the communication device and from the communication target device, identification information of the communication target device after the application is selected,
wherein the application hosted by the communication target device is selected using an extended polling command in which a standard frame is used.

* * * * *